(12) United States Patent
Dawkins et al.

(10) Patent No.: US 11,809,911 B2
(45) Date of Patent: Nov. 7, 2023

(54) RESUMING WORKLOAD EXECUTION IN COMPOSED INFORMATION HANDLING SYSTEM

(71) Applicant: Dell Products L.P., Hopkinton, MA (US)

(72) Inventors: William Price Dawkins, Lakeway, TX (US); Elie Antoun Jreij, Pflugerville, TX (US); Walter A. O'Brien, III, Westborough, MA (US); Mukund P. Khatri, Austin, TX (US); Yossef Saad, Ganei Tikva (IL); Jimmy Doyle Pike, Georgetown, TX (US); Gaurav Chawla, Austin, TX (US); Mark Steven Sanders, Roanoke, VA (US); Robert Wayne Hormuth, Cedar Park, TX (US)

(73) Assignee: DELL PRODUCTS L.P., Hopkinton, MA (US)

(*) Notice: Subject to any disclaimer, the term of this patent is extended or adjusted under 35 U.S.C. 154(b) by 0 days.

(21) Appl. No.: 17/116,832

(22) Filed: Dec. 9, 2020

(65) Prior Publication Data
US 2022/0179696 A1    Jun. 9, 2022

(51) Int. Cl.
*G06F 9/50* (2006.01)
*G06F 11/34* (2006.01)

(52) U.S. Cl.
CPC ............ *G06F 9/505* (2013.01); *G06F 9/5022* (2013.01); *G06F 9/5088* (2013.01);
(Continued)

(58) Field of Classification Search
CPC .... G06F 9/505; G06F 9/5022; G06F 11/3409; G06F 9/5088; G06F 2209/5011; G06F 2209/501; G06F 9/4856
See application file for complete search history.

(56) References Cited

U.S. PATENT DOCUMENTS

| 7,478,117 | B1 | 1/2009 | Lamb et al. |
| 7,606,892 | B2 | 10/2009 | Piet et al. |

(Continued)

OTHER PUBLICATIONS

Anonymous: "Dell Chassis Management Controller Version 6.20 for PowerEdge M1000e" Dec. 3, 2018 (Dec. 3, 2018) 274 pages, Retrieved from the Internet: URL:https://dl/del/com/topicspdf/dell-chassis-management-controller-v620-poweredge-m1000e_users-guide_en-us.pdf.

(Continued)

*Primary Examiner* — Benjamin C Wu
(74) *Attorney, Agent, or Firm* — Chamberlain, Hrdlicka, White, Williams, & Aughtry

(57) ABSTRACT

A system control processor manager for performing workloads using composed information handling systems instantiated using information handling systems includes persistent storage and a workload manager. The workload manager obtains performance information for a workload of the workloads; makes a determination, based on the performance information, to suspend performance of the workload; in response to the determination: deallocates a first computing resource of a composed information handling system performing the workload to a reserved pool; and deallocates a second computing resource of the composed information handling system to a freely allocable pool.

14 Claims, 12 Drawing Sheets

(52) U.S. Cl.
CPC .... *G06F 11/3409* (2013.01); *G06F 2209/501* (2013.01); *G06F 2209/5011* (2013.01)

(56) References Cited

U.S. PATENT DOCUMENTS

| | | |
|---|---|---|
| 7,620,984 B2 | 11/2009 | Kallahalla |
| 8,095,929 B1 | 1/2012 | Ji et al. |
| 8,266,636 B2* | 9/2012 | Kharat ................ G06F 9/4856 |
| | | 719/319 |
| 8,276,140 B1 | 9/2012 | Beda, III et al. |
| 8,285,747 B1 | 10/2012 | English |
| 8,306,948 B2 | 11/2012 | Chou |
| 8,499,066 B1 | 7/2013 | Zhang et al. |
| 8,589,659 B1 | 11/2013 | Shapiro |
| 8,606,920 B1 | 12/2013 | Gupta et al. |
| 8,751,546 B1 | 6/2014 | Grieve |
| 8,997,242 B2 | 3/2015 | Chen |
| 9,104,844 B2 | 8/2015 | Fang |
| 9,105,178 B2 | 8/2015 | Carlson |
| 9,245,096 B2 | 1/2016 | Abuelsaad |
| 9,413,819 B1 | 8/2016 | Berg et al. |
| 9,529,689 B2 | 12/2016 | Ferris et al. |
| 9,569,598 B2 | 2/2017 | Abuelsaad |
| 9,600,553 B1 | 3/2017 | Nigade et al. |
| 9,613,147 B2 | 4/2017 | Carlson |
| 9,678,977 B1 | 6/2017 | Aronovich |
| 9,959,140 B2 | 5/2018 | Jackson |
| 10,097,438 B2 | 10/2018 | Ferris et al. |
| 10,348,574 B2 | 7/2019 | Kulkarni |
| 10,382,279 B2 | 8/2019 | Roese |
| 10,601,903 B2 | 3/2020 | Bivens |
| 10,628,225 B2 | 4/2020 | Yamato |
| 10,756,990 B1 | 8/2020 | Chakkassery Vidyadharan et al. |
| 10,782,882 B1 | 9/2020 | Wu |
| 10,795,856 B1 | 10/2020 | Smith et al. |
| 10,848,408 B2 | 11/2020 | Uriel |
| 10,909,283 B1 | 2/2021 | Wang et al. |
| 10,994,198 B1 | 5/2021 | Byskal et al. |
| 11,119,739 B1 | 9/2021 | Allen et al. |
| 11,134,013 B1 | 9/2021 | Allen et al. |
| 11,221,886 B2 | 1/2022 | Bivens et al. |
| 11,537,421 B1 | 12/2022 | Brooker et al. |
| 2003/0028642 A1 | 2/2003 | Agarwal et al. |
| 2003/0061262 A1 | 3/2003 | Hahn et al. |
| 2003/0233427 A1 | 12/2003 | Taguchi |
| 2004/0257998 A1 | 12/2004 | Chu et al. |
| 2006/0082222 A1 | 4/2006 | Pincu et al. |
| 2006/0230407 A1 | 10/2006 | Rosu et al. |
| 2006/0236100 A1 | 10/2006 | Baskaran et al. |
| 2008/0052480 A1 | 2/2008 | Satoyama et al. |
| 2008/0313476 A1 | 12/2008 | Hansen |
| 2009/0199193 A1 | 8/2009 | Jackson |
| 2010/0217865 A1 | 8/2010 | Ferris |
| 2011/0055378 A1 | 3/2011 | Ferris et al. |
| 2011/0099147 A1 | 4/2011 | Mcalister et al. |
| 2011/0154500 A1 | 6/2011 | Sahita et al. |
| 2011/0307570 A1 | 12/2011 | Speks |
| 2012/0047328 A1 | 2/2012 | Williams et al. |
| 2012/0222084 A1 | 8/2012 | Beaty et al. |
| 2013/0007710 A1 | 1/2013 | Vedula et al. |
| 2013/0311434 A1 | 11/2013 | Jones |
| 2013/0332901 A1 | 12/2013 | Berg et al. |
| 2013/0346718 A1 | 12/2013 | Meshchaninov et al. |
| 2014/0007097 A1 | 1/2014 | Chin et al. |
| 2014/0149635 A1 | 5/2014 | Bacher et al. |
| 2014/0165063 A1* | 6/2014 | Shiva ................ G06F 9/45533 |
| | | 718/1 |
| 2014/0223233 A1 | 8/2014 | Heyrman et al. |
| 2014/0279884 A1 | 9/2014 | Dantkale et al. |
| 2014/0282820 A1 | 9/2014 | Walton et al. |
| 2014/0358972 A1* | 12/2014 | Guarrieri ............... G06F 16/21 |
| | | 707/781 |
| 2014/0359356 A1 | 12/2014 | Aoki |
| 2015/0106165 A1 | 4/2015 | Rai et al. |
| 2015/0178128 A1* | 6/2015 | Knowles ............... G06F 9/5088 |
| | | 718/1 |
| 2015/0220455 A1 | 8/2015 | Chen et al. |
| 2015/0281336 A1* | 10/2015 | Beale ................ G06F 15/17331 |
| | | 709/201 |
| 2015/0317173 A1 | 11/2015 | Anglin |
| 2015/0381426 A1 | 12/2015 | Roese et al. |
| 2016/0062441 A1 | 3/2016 | Chou et al. |
| 2016/0180087 A1 | 6/2016 | Edwards et al. |
| 2016/0224903 A1 | 8/2016 | Talathi et al. |
| 2016/0259665 A1 | 9/2016 | Gaurav et al. |
| 2017/0034012 A1 | 2/2017 | Douglas et al. |
| 2017/0041184 A1 | 2/2017 | Broz et al. |
| 2017/0048200 A1 | 2/2017 | Chastain |
| 2017/0097851 A1 | 4/2017 | Chen |
| 2017/0118247 A1 | 4/2017 | Hussain |
| 2017/0195201 A1 | 7/2017 | Mueller et al. |
| 2017/0201574 A1 | 7/2017 | Luo |
| 2018/0024964 A1 | 1/2018 | Mao |
| 2018/0063145 A1 | 3/2018 | Cayton et al. |
| 2018/0157429 A1* | 6/2018 | Venkat .................... G06F 3/061 |
| 2019/0065061 A1 | 2/2019 | Kim et al. |
| 2019/0065256 A1 | 2/2019 | Hamilton et al. |
| 2019/0079837 A1 | 3/2019 | Agarwal et al. |
| 2019/0164087 A1 | 5/2019 | Ghibril et al. |
| 2019/0188014 A1 | 6/2019 | Easterling et al. |
| 2019/0190778 A1 | 6/2019 | Easterling et al. |
| 2019/0205180 A1 | 7/2019 | Macha et al. |
| 2019/0227616 A1 | 7/2019 | Jenne et al. |
| 2019/0324808 A1 | 10/2019 | Krishnan et al. |
| 2019/0334774 A1 | 10/2019 | Bennett et al. |
| 2019/0356729 A1 | 11/2019 | Bivens et al. |
| 2019/0356731 A1 | 11/2019 | Bivens et al. |
| 2019/0384516 A1 | 12/2019 | Bernat |
| 2019/0384648 A1 | 12/2019 | Wiggers et al. |
| 2019/0386902 A1 | 12/2019 | Mueller et al. |
| 2020/0026564 A1 | 1/2020 | Bahramshahry et al. |
| 2020/0028854 A1 | 1/2020 | Fabrizi et al. |
| 2020/0034221 A1 | 1/2020 | Ganesan et al. |
| 2020/0034528 A1 | 1/2020 | Yang et al. |
| 2020/0044966 A1 | 2/2020 | Krishnan et al. |
| 2020/0065254 A1 | 2/2020 | Cao et al. |
| 2020/0097358 A1 | 3/2020 | Mahindru et al. |
| 2020/0174949 A1* | 6/2020 | Ramasamy ......... G06F 12/1408 |
| 2020/0218561 A1 | 7/2020 | Lal et al. |
| 2020/0233582 A1 | 7/2020 | Chen et al. |
| 2020/0285502 A1* | 9/2020 | Hildebrand ........... G06F 9/5011 |
| 2020/0293375 A1 | 9/2020 | Klein |
| 2020/0341786 A1 | 10/2020 | Soryal |
| 2020/0341798 A1 | 10/2020 | Duleba |
| 2020/0351221 A1 | 11/2020 | Subramani et al. |
| 2020/0356200 A1 | 11/2020 | Blanco et al. |
| 2020/0358714 A1 | 11/2020 | Singleton, IV et al. |
| 2021/0019062 A1 | 1/2021 | Fessel |
| 2021/0019162 A1 | 1/2021 | Viswanathan et al. |
| 2021/0037466 A1 | 2/2021 | Silva et al. |
| 2021/0111942 A1 | 4/2021 | Tahhan et al. |
| 2021/0117389 A1 | 4/2021 | Cui et al. |
| 2021/0117441 A1 | 4/2021 | Patel et al. |
| 2021/0152659 A1 | 5/2021 | Cai et al. |
| 2021/0224093 A1 | 7/2021 | Fu et al. |
| 2021/0367901 A1 | 11/2021 | Singh et al. |
| 2021/0397494 A1 | 12/2021 | Graham |
| 2022/0179701 A1 | 6/2022 | Saad et al. |
| 2022/0197773 A1 | 6/2022 | Butler et al. |
| 2023/0026690 A1 | 1/2023 | Dawkins et al. |
| 2023/0033296 A1 | 2/2023 | Shetty et al. |

OTHER PUBLICATIONS

International Searching Authority, International Search Report and Written Opinion dated Oct. 21, 2021 for corresponding PCT Application No. PCTUS2021029708 filed Apr. 28, 2021.

International Searching Authority, International Search Report and Written Opinion for corresponding PCT Application No. PCTUS2021029702 filed Apr. 28, 2021, dated Aug. 19, 2021, 13 pages.

(56) References Cited

OTHER PUBLICATIONS

International Searching Authority, International Search Report and Written Opinion dated Jul. 19, 2021, issued in corresponding PCT Application No. PCT/US2021/029687, 11 pages.
International Searching Authority, International Search Report and Written Opinion of corresponding PCT Application No. PCT/US2021/029698, dated Aug. 9, 2021, 15 pages.
Alachiotis, Nikolaos, et al. "dReDBox: A disaggregated architectural perspective for data centers." Hardware Accelerators in Data Centers. Springer, Cham, 2019. pp. 35-56. (Year: 2019).
Mohammadi et al, Towards an end-to-end architecture, Towards an end-to-end architecture, 2018, pp. 514-518, 44th Euromicro Conference (5 pages).
Chunlin, Li, Tang Jianhang, and Luo Youlong, Hybrid cloud adaptive scheduling strategy for heterogeneous workloads, Hybrid cloud adaptive scheduling strategy for heterogeneous workloads, Year: 2019, pp. 419-446, Journal of Grid Computing 17 (28 pages).

* cited by examiner

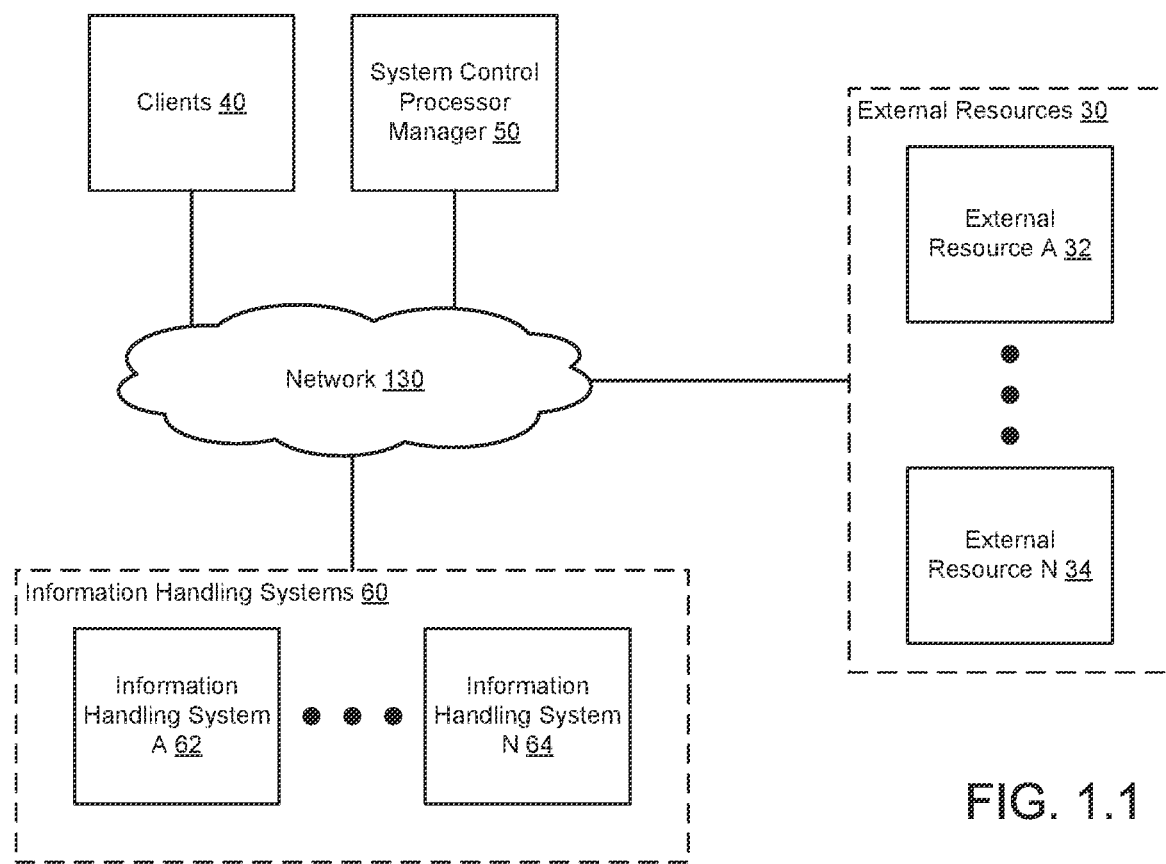
FIG. 1.1

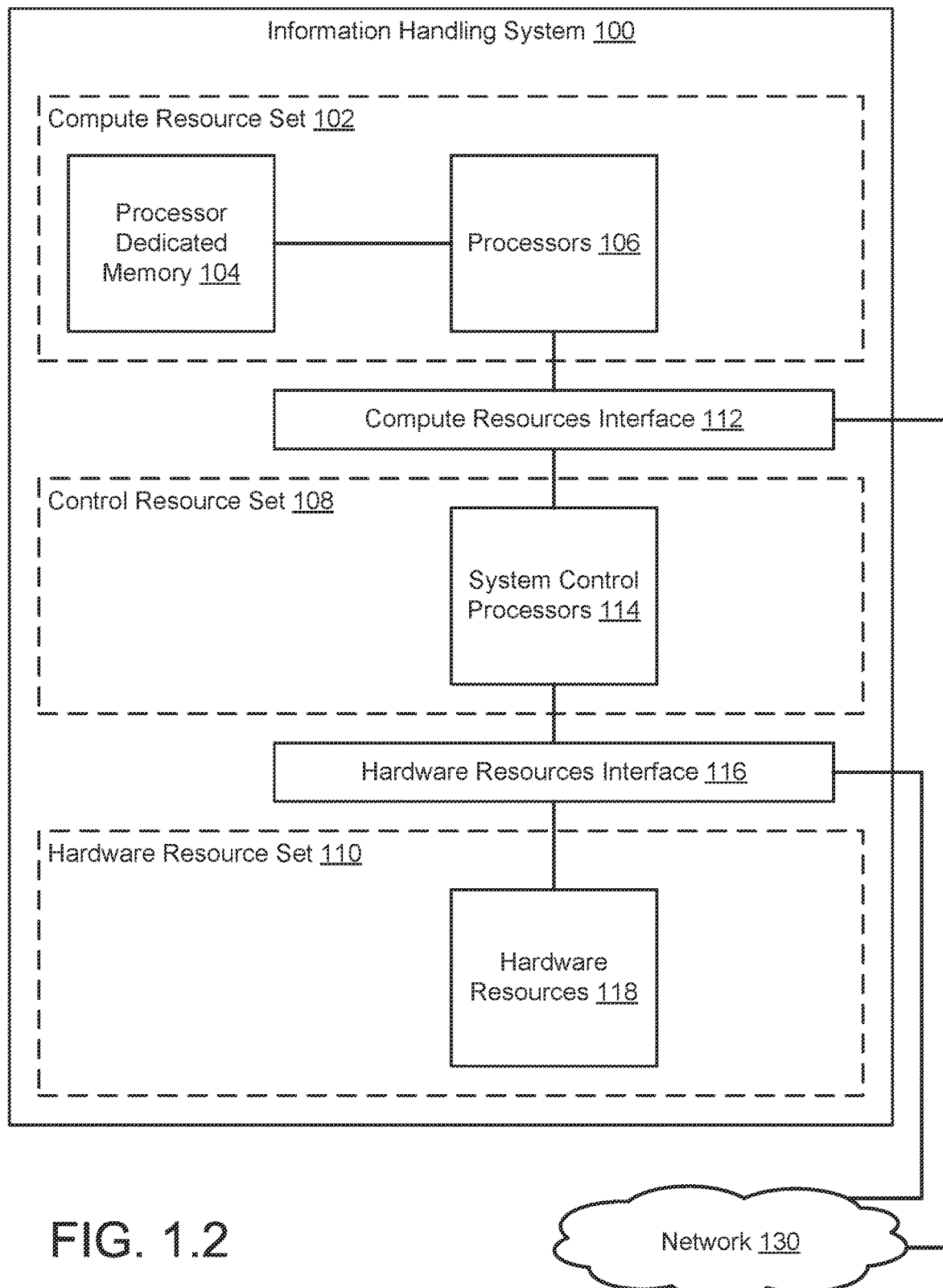
FIG. 1.2

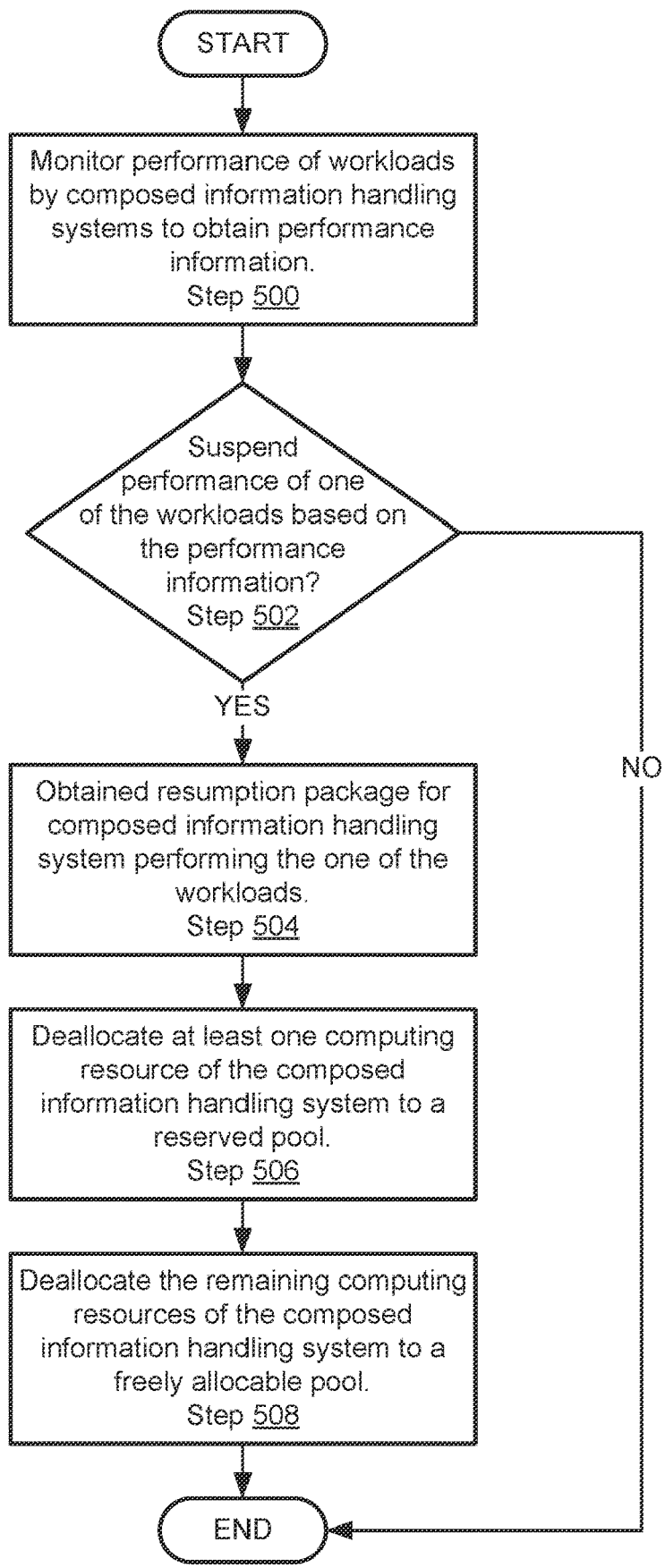
FIG. 5.1

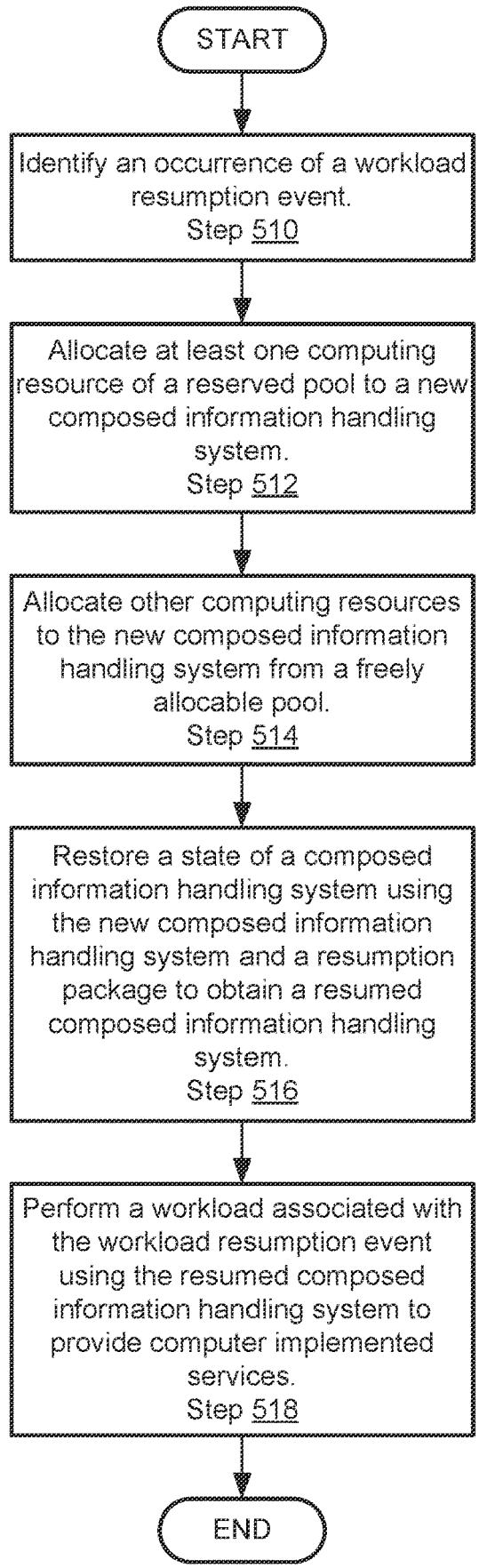
FIG. 5.2

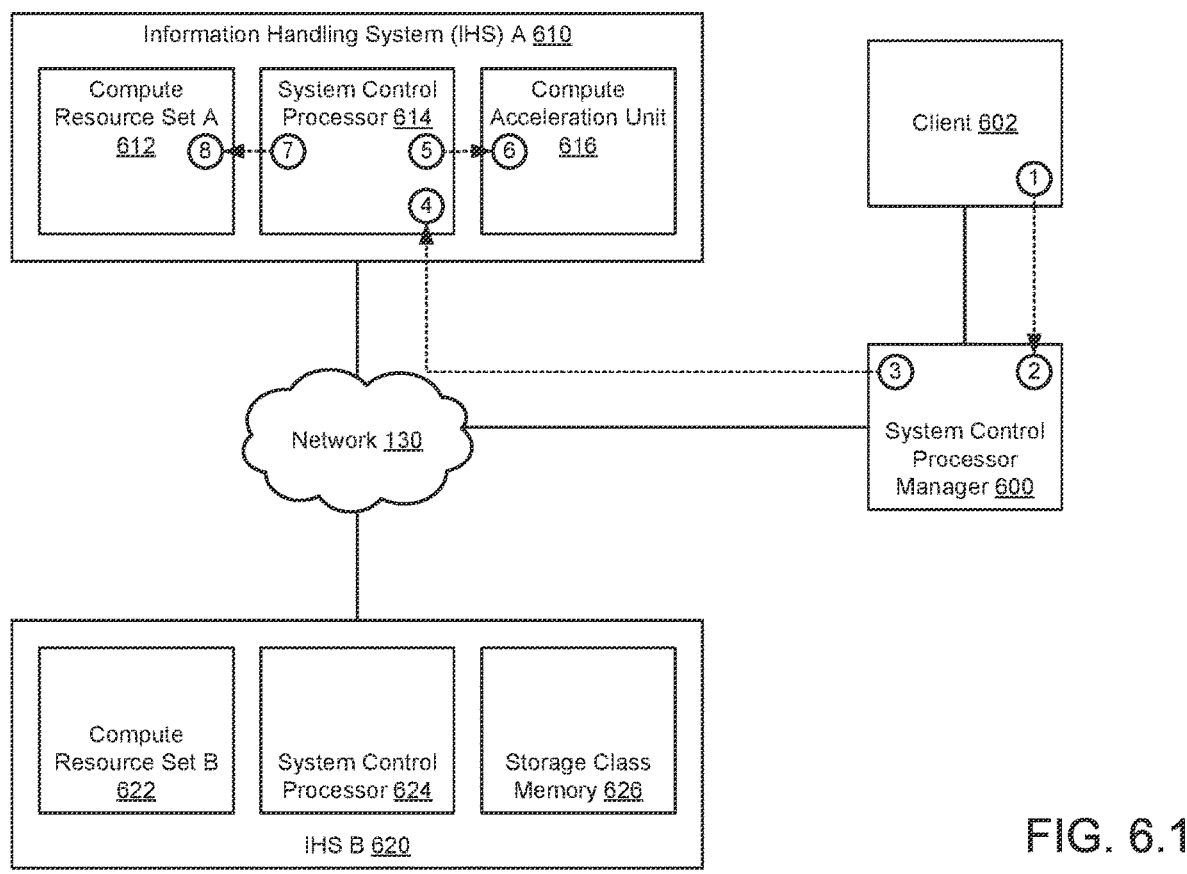
FIG. 6.1

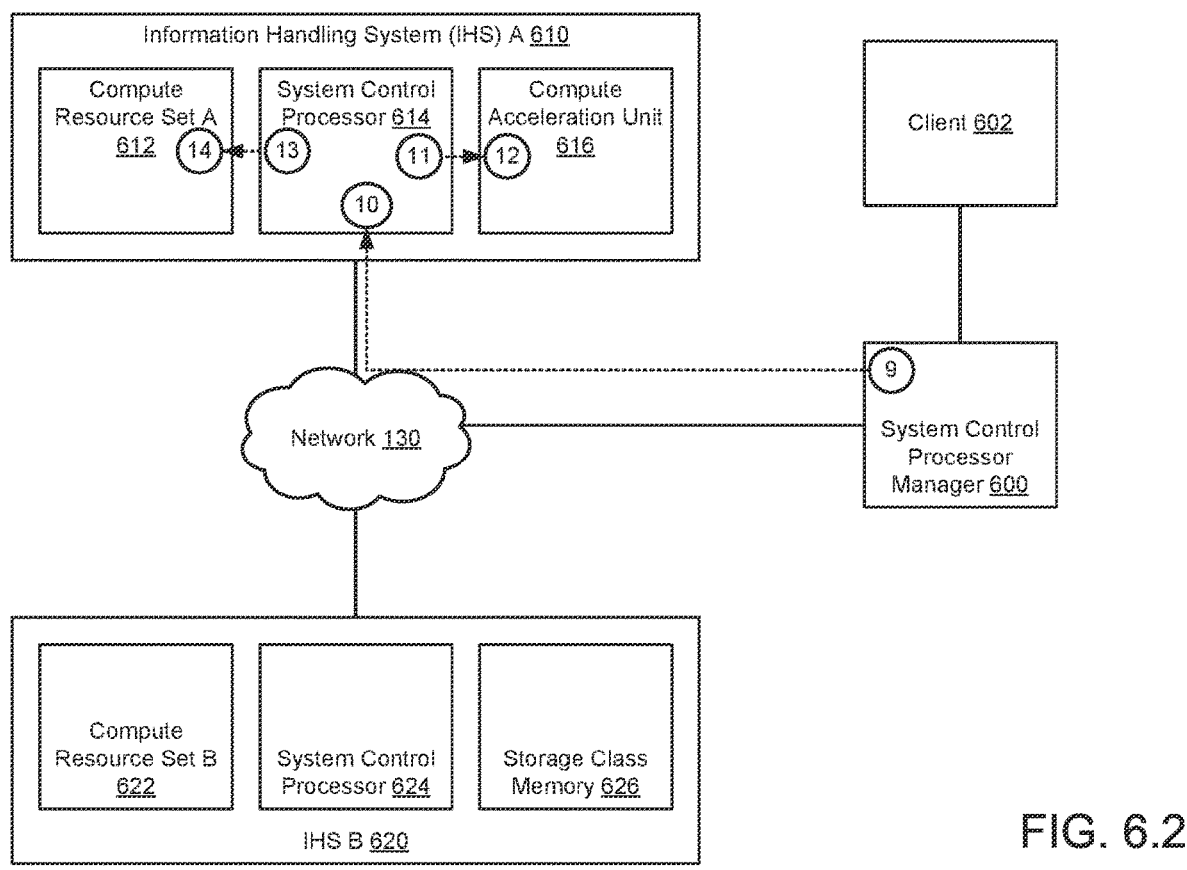
FIG. 6.2

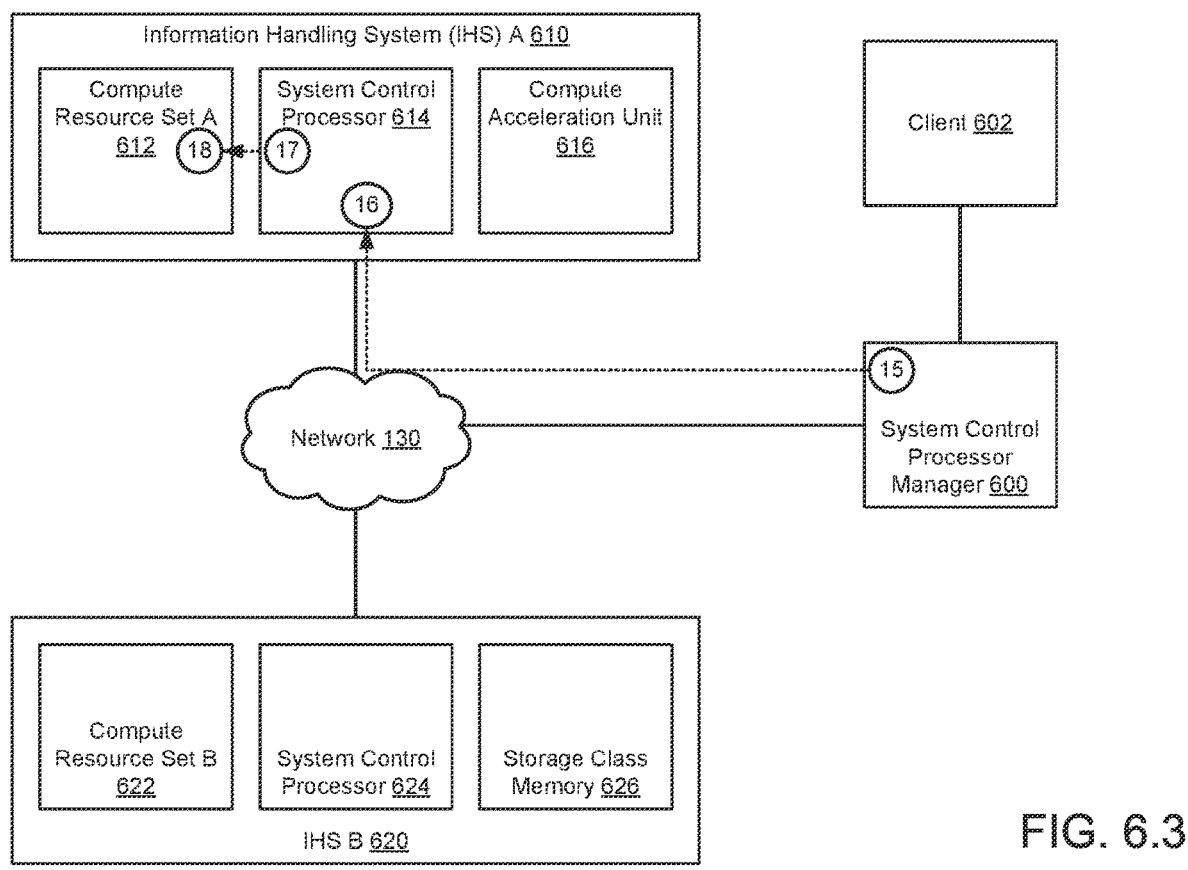
FIG. 6.3

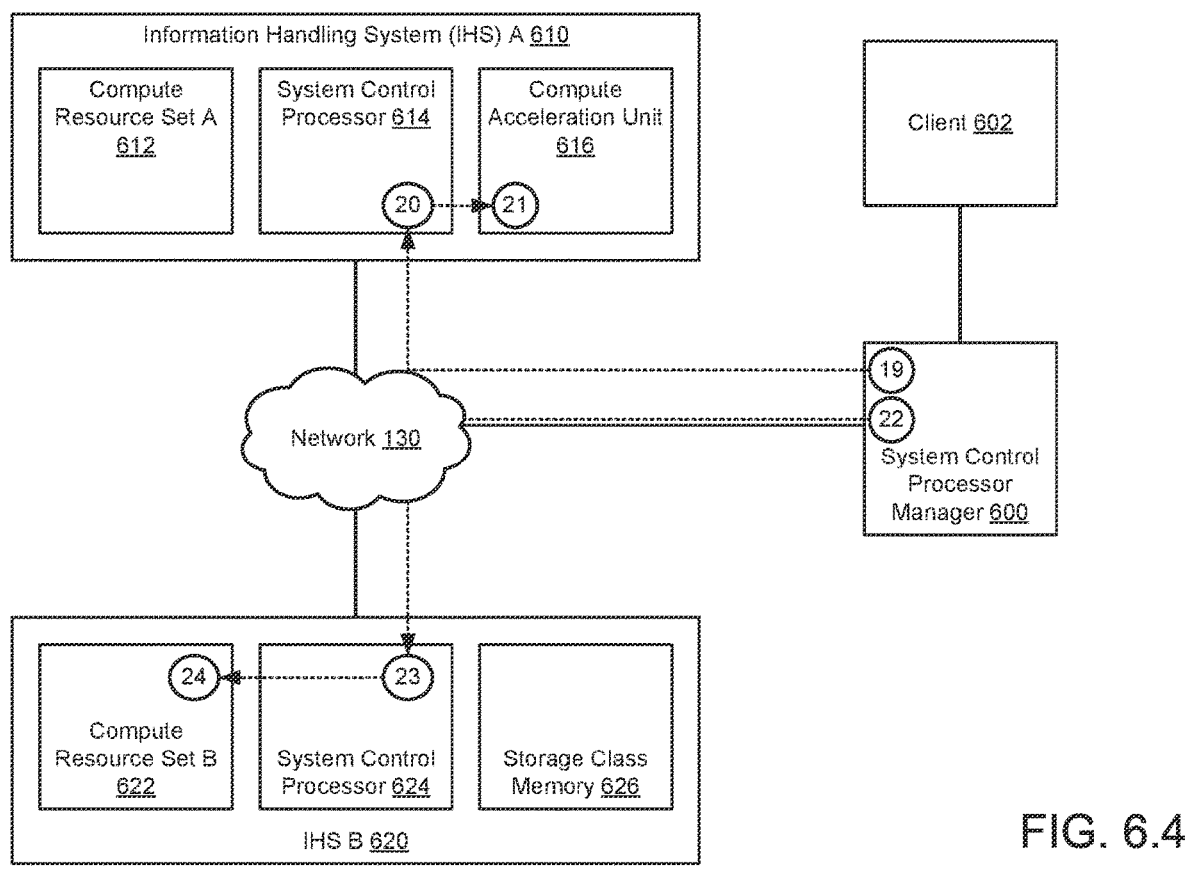
FIG. 6.4

RESUMING WORKLOAD EXECUTION IN COMPOSED INFORMATION HANDLING SYSTEM

BACKGROUND

Computing devices may provide services. To provide the services, the computing devices may include hardware components and software components. The services provided by the computing devices may be limited by these components.

SUMMARY

In one aspect, a system control processor manager for performing workloads using composed information handling systems instantiated using information handling systems in accordance with one or more embodiments of the invention includes persistent storage and a workload manager. The workload manager obtains performance information for a workload of the workloads; makes a determination, based on the performance information, to suspend performance of the workload; in response to the determination: deallocates a first computing resource of a composed information handling system performing the workload to a reserved pool; and deallocates a second computing resource of the composed information handling system to a freely allocable pool.

In one aspect, a method for performing workloads using composed information handling systems instantiated using information handling systems in accordance with one or more embodiments of the invention includes obtaining performance information for a workload of the workloads; making a determination, based on the performance information, to suspend performance of the workload; in response to the determination: deallocating a first computing resource of a composed information handling system performing the workload to a reserved pool; and deallocating a second computing resource of the composed information handling system to a freely allocable pool.

In one aspect, a non-transitory computer readable medium in accordance with one or more embodiments of the invention includes computer readable program code, which when executed by a computer processor enables the computer processor to perform a method for performing workloads using composed information handling systems instantiated using information handling systems. The method includes obtaining performance information for a workload of the workloads; making a determination, based on the performance information, to suspend performance of the workload; in response to the determination: deallocating a first computing resource of a composed information handling system performing the workload to a reserved pool; and deallocating a second computing resource of the composed information handling system to a freely allocable pool.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an information handling system in accordance with one or more embodiments of the invention.

FIG. 5.1 shows a flowchart of a method of suspending performance of a workload in accordance with one or more embodiments of the invention.

FIG. 5.2 shows a flowchart of a method of resuming performance of a workload that is suspended from performance in accordance with one or more embodiments of the invention.

FIGS. 6.1-6.4 show diagrams of the operation of an example system over time in accordance with one or more embodiments of the invention.

DETAILED DESCRIPTION

Figure 2:
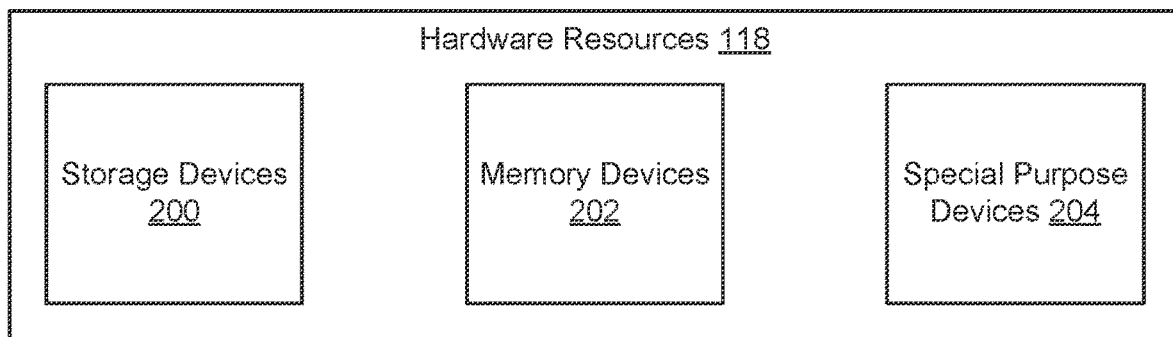
FIG. 2 shows a diagram of hardware resources in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may need to be allocated for the performance of the services by performing corresponding workloads. The computing resources may include, for example, processing resources, memory resources, storage resources, communications resources, etc.

To allocate the computing resources, composed information handling systems may be instantiated. A composed information handling system may be a device (the components of which may be distributed across one or more information handling systems) that has exclusive use over a quantity of computing resources. Computing resources from multiple information handling systems may be allocated to a composed information handling system thereby enabling a composed information handling system to utilize computing resources from any number of information handling systems for performance of corresponding computer implemented services.

To manage computing resource allocation, the system may dynamically allocate computing resources to and deallocate computing resources from composed information handling systems based on demand levels for services provided by the composed information handling systems. By doing so, the quantity of computing resources allocated to the composed information handling system may be matched to that required to meet the service demands placed on the composed information handling systems. Consequently, over-provisioning and under-provisioning of computing resources for the composed information handling systems may be less likely to occur. Accordingly, the efficiency of use of computing resources may be improved.

When computing resources are deallocated from a composed information handling system, the deallocated computing resources may join a pool of resources that is freely allocable or other pools (e.g., reserved pools) that impose restrictions on allocations of computing resources of those other pools. The system may preferentially deallocate computing resources that include state dependent hardware devices to reserved pools. By doing so, hardware devices that may need to be placed in predetermined states (i.e., state dependent hardware devices) to provide desired computing resources may be reserved for future allocation for providing corresponding computer implemented services. Accordingly, the time required to instantiate a composed system may be reduced by virtue of the availability of the reserved computing resources.

By reserving the aforementioned computing resources, the system may be less likely to suffer performance penalties (e.g., due to need to modify hardware device states) for temporarily suspending performance of workloads by deallocating computing resources and resuming the performance suspended workloads by allocating computing resources (e.g., by adding additional resources to an existing composed information handling system or by instantiating a new composed information handling system) for performance of the workloads. Consequently, the system may be able to granularly allocate computing resource to and deallocate computing resources from the performance of various workloads while limiting the performance penalty for resuming suspended workloads. Accordingly, the system may be better able to provide computer implemented services at all points in time.

FIG. 1.1 shows a system in accordance with one or more embodiments of the invention. The system may include any number of information handling systems (60). The information handling systems (60) may provide computer implemented services. The computer implemented services may include, for example, database services, data storage services, electronic communications services, data protection services, and/or other types of services that may be implemented using information handling systems.

Any of these services may impose workloads on various components of the information handling systems. Due to the limited quantity of computing resources of the information handling systems, only a limited number and size of workloads may be performed at any point in time.

Additionally, the demand for different services may change over time. For example, at a first point in time there may be high demand for database services (e.g., while many employees of a company are utilizing information included in the database) while at a second point in time there may be a low demand for the database services (e.g., after employees have left for the day). Consequently, continuously allocating the same quantity of computing resources for a service over time may result in inefficient use of the computing resources during periods of low demand for the service.

The information handling system of the system of FIG. 1.1 may operate independently and/or cooperatively to provide the computer implemented services by performing various workloads. For example, a single information handling system (e.g., 62) may provide a computer implemented service on its own (i.e., independently) while multiple other information handling systems (e.g., 62, 64) may provide a second computer implemented service cooperatively (e.g., each of the multiple other information handling systems may provide similar and/or different services that form the cooperatively provided service).

To provide computer implemented services, the information handling systems (60) may utilize computing resources provided by hardware devices. The computing resources may include, for example, processing resources, storage resources, memory resources, graphics processing resources, communications resources, and/or other types of resources provided by the hardware devices. Various hardware devices may provide these computing resources.

The type and quantity of computing resources required to provide computer implemented services may vary depending on the type and quantity of computer implemented services to be provided thereby placing different types and magnitudes of workloads on the information handling systems (60). For example, some types of computer implemented services may be more compute intensive (e.g., modeling) while other computer implemented services may be more storage intensive (e.g., database) thereby having different computing resource requirements for these different services. Consequently, the ability to perform workloads may not be predicated entirely on the number of workloads being performed. Rather, a single type of computing resource may limit the performance of multiple workloads concurrently even if other types of computing resources are abundant.

Additionally, some workloads may utilize hardware devices that operate in accordance with their states. For example, a compute acceleration unit may sequentially perform calculations on data stored in the compute acceleration unit thereby changing the state of the compute acceleration unit over time. If a workload utilizes a hardware device that operates in accordance with one or more states, the state of the hardware device may need to be retained to enable a workload to be resumed after performance of the workload is suspended. Consequently, for workloads to be suspended and restarted based on demand levels for the workloads, state information reflecting the one or more previous states of the hardware devices may need to be maintained.

Clients (40) may request that the computer implemented services be provided. For example, the clients (40) may send requests to management entities to have the computer implemented services be provided. Consequently, the number and types of workloads to be performed over time may change.

In general, embodiments of the invention relate to systems, methods, and devices for managing the hardware resources of the information handling systems (62) and/or other resources (e.g., external resources (30)) to provide computer implemented services. The hardware resources of the information handling systems (62) may be managed by instantiating and/or recomposing one or more composed information handling systems using the hardware resources of the information handling systems (60), external resources (30), and/or other types of hardware devices operably connected to the information handling systems (60) to perform workloads to provide the computer implemented services.

As the demand for workloads changes over time, the system may automatically recompose composed information handling systems performing the workloads by (i) allocating additional computing resources for performance of the workloads, (ii) deallocate computing resources for performance of the workloads, and/or (iii) for workloads that utilize state dependent hardware devices, state information for the devices may be maintained. The state information may be usable to place the state dependent hardware devices into one or more states that allow for the performance of workloads (that were previously being performed) to be resumed.

Additionally, the system may, when computing resources are deallocated from performance of a workload, limit the ability of all, or a portion, of the deallocated computing resources from being allocated for the performance of other workloads. For example, to maintain a state of a state dependent hardware device, the system may reserve the state dependent hardware device after deallocation from performance of a workload. By doing so, the state of the state dependent hardware device may be maintained until it is reallocated for resumption of performance of the workload. Thus, in some embodiments of the invention, the system may maintain state information by reserving hardware devices while in other embodiments of the invention, as will be discussed in greater detail below, a data structure (e.g., a resumption package) may be generated that may be used to program one or more state dependent hardware devices to place them into one or more states.

When computing resources are deallocated from performance of workload, a portion of them may then be freely allocated to other workloads. The portion may include devices that are not dependent on state for their operation. For example, the portion may include processors, memory, storage devices, and/or other types of state independent hardware devices. In contrast, state dependent hardware devices may include, for example, graphics processing units, compute acceleration units, structured storages (e.g., those with chronological dependence such as queues), etc.

Due to the limited number of computing resources of the information handling systems, only a limited number of composed information handling systems may be instantiated at any point in time. Accordingly, the allocation of computing resources to composed information handling systems for performance of workloads may need to be rationed so that other composed information handling systems may be instantiated to provide other services.

In one or more embodiments of the invention, the system includes a system control processor manager (50). The system control processor manager (50) may provide composed information handling system composition services. Composed information handling system composition services may include (i) obtaining requests for computer implemented services from the clients (40) (e.g., composition requests which may require instantiation of a composed information handling system to service the requests), (ii) performing the computer implemented services using the composed information handling system, (iii) monitoring the workloads being performed using the composed information handling system, and (iv) recomposing the composed information handling systems over time based on the monitored workload performance. When recomposing the composed information handling systems, the system control processor manager may generate and/or maintain information reflecting the states of state dependent hardware devices. By doing so, the quantity and quality of computer implemented services provided by the system of FIG. 1.1 may be improved by, for example, reducing over-provisioning of computing resources by deallocating the computing resources from composed information handling systems, reducing under-provisioning of resources by automatically allocating additional computing resources to composed information handling systems based on their workloads, and/or utilizing maintained state information to restore states of hardware devices when allocated to composed information handling systems thereby enabling performance of workloads using state dependent hardware devices to be resumed.

In one or more embodiments of the invention, the system control processor manager (50) instantiates composed information handling systems and recomposes composed information handling systems (e.g., allocates additional computing resources to, deallocates computing resources from the composed information handling systems, and/or maintains state information regarding state dependent hardware devices of the composed information handling systems) in accordance with a three resource set model. As will be discussed in greater detail below, the computing resources of an information handling system may be divided into three logical resource sets: a compute resource set, a control resource set, and a hardware resource set. Different resource sets, or portions thereof, from the same or different information handling systems may be aggregated (e.g., caused to operate as a computing device) to instantiate a composed information handling system having at least one resource set from each set of the three resource set model. These resource sets may be managed in accordance with a resource reservation system that makes it more likely that necessary computing resources will be available for performance of workloads as the computing resource demands for performance of the workloads changes of time.

The reservation system may divide different types of computing resources into at least two pools. A first pool may be a pool (e.g., a freely allocable pool) that includes computing resources that may be freely allocated for the performance of any type of workload. For example, the first pool may include processors, memory, and other types of state independent hardware devices. A second pool may be a pool (e.g., a reserved pool) which limits the allocation of computing resources in the second pool for the performance of a limited subset of workloads (e.g., workloads for which performance has been suspended). When computing resources are deallocated, a type of the computing resources may be utilized to determine into which pool a respective resource is to be added.

By logically dividing the computing resources of an information handling system into resource sets and limiting allocation of the resources based on membership status in different types of pools, different quantities and types of computing resource may be allocated to each composed information handling system thereby enabling the computed resources allocated to the respective information handling system to match the requirements of performed workloads over time. Further, dividing the computing resources in accordance with the three set model may enable different resource sets to be differentiated (e.g., given different personalities) to provide different functionalities. Consequently, composed information handling systems may be composed on the basis of desired functionalities rather than just on the basis of aggregate resources to be included in the composed information handling system. Accordingly, these functionalities may be allocated to composed information handling systems using the corresponding computing resources.

Additionally, by composing composed information handling systems in this manner, the control resource set of each composed information handling system may be used to consistently deploy management services across any number of composed information handling systems. Consequently, embodiments of the invention may provide a framework for unified security, manageability, resource management/composability, workload management, and distributed system management by use of this three resource set model.

For example, workload monitors may be deployed in control resource sets to monitor the use of the other resource sets for performing various workloads to provide desired computer implemented services. Accordingly, use of these computing resources may be uniformly monitored across the information handling systems (60) to obtain information usable to generate predictions of future computing resource needs, to obtain and maintain state information for state dependent hardware devices, and/or otherwise manage the computing resources of composed information handling systems. For additional details regarding the system control processor manager (50), refer to FIG. 4.

In one or more embodiments of the invention, a composed information handling system is a device that is formed using all, or a portion, of the computing resources of the information handling systems (60), the external resources (30), and/or other types of hardware devices operably connected to the information handling systems (60). The composed information handling system may utilize the computing resources allocated to it to provide computer implemented services. For example, the composed information handling system may host one or more applications that utilize the computing resources assigned to the composed information handling system thereby placing a workload on the computing resources. The applications may provide the computer implemented services.

To instantiate composed information handling systems, the information handling systems (60) may include at least three resource sets including a control resource set. The control resource set may include a system control processor. The system control processor of each information handling system may coordinate with the system control processor manager (50) to enable composed information handling systems to be instantiated. For example, the system control processor of an information handling system may provide telemetry data regarding the computing resources of an information handling system, may perform actions on behalf of the system control processor manager (50) to aggregate computing resources together, may monitor the utilization of computing resources for providing computer implemented services, and/or may provide services that unify the operation of composed information handling systems.

In one or more embodiments of the invention, compute resource sets of composed information handling systems are presented with bare metal resources by control resource sets even when the presented resources are actually being managed using one or more layers of abstraction, emulation, virtualization, security model, etc. For example, the system control processors of the control resource sets may provide the abstraction, emulation, virtualization, and/or other services while presenting the resources as bare metal resources. Consequently, these services may be transparent to applications hosted by the compute resource sets of composed information handling systems thereby enabling uniform deployment of such services without requiring implementation of control plane entities hosted by the compute resource sets of the composed information handling systems. Accordingly, by utilizing system control processors to monitor the use of the computing resources of a composed information handling system, applications or other entities hosted by the composed information handling system may not be able to view, be aware, impact, or otherwise influence the collection of computing resource use data.

After a composed information handling system is composed, it may be recomposed by adding or removing computing resources from it. As discussed above, embodiments of the invention provide for the dynamic modification of computing resources allocated to composed information handling systems to match the requirements of workloads being performed by these systems. For additional details regarding the information handling systems (60), refer to FIG. 1.2.

The external resources (30) may provide computing resources that may be allocated for use by composed information handling systems. For example, the external resources (30) may include hardware devices that provide any number and type of computing resources. The composed information handling system may use these resources to provide their functionalities. For example, system control processors may operably connect to and manage the external resources (30) to provide additional and/or different computing resources from those available to be provided only using hardware resource sets of information handling systems. By utilizing system control processors to manage these resources, the use of these external resources (30) by the clients (40) may also be efficiently and transparently monitored.

Different external resources (e.g., 32, 34) may provide similar or different computing resources. For example, some external resources may include large numbers of hard disk drives to provide storage resources while others may include graphics processing unit rendering farms. The external resources (30) may include any number and type of computing resources for allocation to composed information handling systems via system control processors of control resource sets.

The system of FIG. 1.1 may include any number of information handling systems (e.g., 62, 64), any number of external resources (e.g., 32, 34), and any number of system control processor managers (e.g., 50). Any of the components of FIG. 1.1 may be operably connected to any other component and/or other components not illustrated in FIG. 1.1 via one or more networks (e.g., 130). The networks may be implemented using any combination of wired and/or wireless network topologies.

The clients (40), system control processor manager (50), information handling systems (60), and/or external resources (30) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor manager (50), information handling systems (60), and/or external resources (30) described in this application and/or all, or a portion, of the methods illustrated in FIGS. 5.1-5.2. The clients (40), system control processor manager (50), information handling systems (60), and/or external resources (30) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 1.2, FIG. 1.2 shows a diagram of an information handling system (100) in accordance with one or more embodiments of the invention. Any of the information handling systems (e.g., 60) of FIG. 1.1 may be similar to the information handling system (100) illustrated in FIG. 1.2.

As discussed above, the information handling system (100) may provide any quantity and type of computer implemented services. To provide the computer implemented services, resources of the information handling system (100) may be used to instantiate one or more composed information handling systems. The composed information handling systems may provide the computer implemented services.

To provide computer implemented services, the information handling system (100) may include any number and type of hardware devices including, for example, one or more processors (106), any quantity and type of processor dedicated memory (104), one or more system control processors (114), and any number of hardware resources (118). These hardware devices may be logically divided into three resource sets including a compute resource set (102), a control resource set (108), and a hardware resource set (110).

The control resource set (108) of the information handling system (100) may facilitate formation of composed information handling systems. To do so, the control resource set (108) may prepare any quantity of resources from any number of hardware resource sets (e.g., 110) (e.g., of the information handling system (100) and/or other information handling systems) for presentation to processing resources of any number of computing resource sets (e.g., 102) (e.g., of the information handling system (100) and/or other information handling systems). Once prepared, the control resource set (108) may present the prepared resources as bare metal resources to the processors (e.g., 106) of the allocated computing resources. By doing so, a composed information handling system may be instantiated.

To prepare the resources of the hardware resource sets for presentation, the control resource set (108) may employ, for example, virtualization, indirection, abstraction, and/or emulation. These management functionalities may be transparent to applications hosted by the resulting instantiated composed information handling systems. Consequently, while unknown to the control plane entities of the composed information handling system, the composed information handling system may operate in accordance with any number of management models thereby providing for unified control and management of composed information handling systems. These functionalities may be transparent to applications hosted by composed information handling systems thereby relieving them from overhead associated with these functionalities.

For example, consider a scenario where a control resource set is instructed to instantiate a composed information handling system including a compute resource set and a hardware resource set that will contribute storage resources to the compute resource set. The control resource set may virtualize the storage resources of the hardware resource set to enable a select quantity of the storage resources to be allocated to the composed information handling system while reserving some of the storage resources for allocation to other composed information handling systems. However, the prepared storage resources may be presented to the compute resource set as bare metal resources. Consequently, the compute resource set may not need to host any control plane entities or otherwise incur overhead for utilizing the virtualized storage resources.

When preparing resources for presentation to other resources, the control resource set (108) may modify a state of one or more hardware device. For example, the control resource set (108) may restore a state of a hardware device (e.g., a state dependent hardware device) by writing information to the hardware device. The control resource set (108) may do so in accordance with instructions received from a system control processor manager that is resuming the performance of a workload which requires the state of the hardware device to be in a predetermined state for the workload to be correctly performed.

The control resource set (108) may also enable the utilization of any of the hardware components of the information handling system (100) by respective clients. When a composed information handling system is instantiated, it (and its hardware devices) may be utilized to perform workloads (e.g., to provide desired computer implemented services by performing corresponding workloads).

Because the control resource set (108) may mediate utilization of hardware resource sets (110) by compute resource sets (102), the control resource set (108) may transparently ascertain the use of the hardware devices of these resource sets for performance of workloads. To do so, the control resource set (108) may intercept (as part of presenting computing resources of hardware resource sets to compute resource sets) communications between resource sets, monitor workloads being performed by each of the respective resource sets, monitor power utilization by these resource sets, and/or may perform other actions to identify the performance and ability of workloads to be performed over time.

The collected workload information may be provided to the system control processor manager of FIG. 1.1 or other entities. As noted above, the system control processor manager may utilize the collected information to ascertain likely computing resource needs in the future for performing various workloads.

The compute resource set (102) may include one or more processors (106) operably connected to the processor dedicated memory (104). Consequently, the compute resource set (102) may host any number of executing processes thereby enabling any number and types of workloads to be performed. When performing the workloads, the compute resource set (102) may utilize computing resources provided by the hardware resource set (110) of the information handling system (100), hardware resource sets of other information handling systems, and/or external resources.

The processors (106) of the compute resource set (102) may be operably connected to one or more system control processors (114) of the control resource set (108). For example, the processors (106) may be connected to a compute resource interface (112), which is also connected to the system control processors (114). The compute resource interface (112) may enable the processors (106) to communicate with other entities via bare metal communications. Also, the compute resource interface (112) may enable system control processors (114) of the control resource set (108) to monitor the activity of the processors (106) and/or processor dedicated memory (104) to identify use of these hardware devices by clients. For example, the compute resources interface (112) may support sideband communications to the hardware devices of the compute resource set (102) thereby enabling utilization information for these hardware devices to be obtained by the system control processors (114).

The system control processors (114) of the control resource set (108) may present computing resources to the processors (106) as bare metal resources. In other words, from the point of view of the processors (106), any number of bare metal resources may be operably connected to it via the compute resources interface (112) when, in reality, the system control processors (114) are operably connected to the processors (106) via the compute resources interface (112). In other words, the system control processors (114) may manage presentation of other types of resources (e.g., computing resources of the hardware resource set (110), external resources, other hardware resource sets of other information handling systems, etc.) to the compute resource set (102).

By presenting the computing resources to the processors as bare metal resources, control plane entities (e.g., applications) such as hypervisors, emulators, and/or other types of management entities may not need to be hosted (e.g., executed) by the processors (106) for the processors (106) and entities hosted by them to utilize the computing resources allocated to a composed information handling system. Accordingly, all of the processing resources provided by the compute resource set (102) may be dedicated to providing the computer implemented services.

For example, the processors (106) may utilize mapped memory addresses to communicate with the bare metal resources presented by the system control processors (114) to the processors (106). The system control processors (114) may obtain these communications and appropriately remap (e.g., repackage, redirect, encapsulate, etc.) the communications to the actual hardware devices providing the computing resources, which the processors (106) are interacting with via the compute resources interface (112) and/or hardware resources interface (116), discussed below. Consequently, indirection, remapping, and/or other functions required for resource virtualization, emulation, abstraction, or other methods of resource allocation (other than bare metal) and management may not need to be implemented via the processors (106).

By doing so, any number of functions for a composed information handling system may be automatically performed in a manner that is transparent to the control plane. Accordingly, a composed information handling system may operate in a manner consistent with a unified, consistent architecture or model (e.g., communications model such as secured communications using a virtual private network, data storage model such as storing multiple copies of data or adding error correction code data to stored data, etc.) by configuring the operation of one or more system control processors in a manner consistent with the architecture or model.

In one or more embodiments of the invention, control plane entities utilize computing resources presented through one or more layers of indirection, abstraction, virtualization, etc. In other words, the control plane entities may be indirect users of hardware devices and computing resources provided thereby. In the information handling system of FIG. 1.2, the system control processors (114) may present, as bare metal resources, abstracted resources, indirection layers, virtualization layers, etc.

In one or more embodiments of the invention, data plane entities directly utilize computing resources. For example, data plane entities may instruct hardware devices on their operation thereby directly utilizing computing resources provided thereby. Data plane entities may present the computing resources to control plane entities using one or more layers of indirection, abstraction, virtualization, etc.

The system control processors (114) may present any number of resources operably connected to it (e.g., the hardware resource set (110), other resources operably connected to it via an interface (e.g., hardware resources interface (116), etc.) as bare metal resources to the processors (106) of the compute resource set (102). Consequently, the system control processors (114) may implement device discovery processes compatible with the processors (106) to enable the processors (106) to utilize the presented computing resources.

For example, the hardware resource set (110) may include hardware resources (118) operably connected to the system control processors (114) via a hardware resources interface (116). The hardware resources (118) may include any number and type of hardware devices that provide computing resources. For additional details regarding the hardware resources (118), refer to FIG. 2.

In another example, the system control processors (114) may be operably connected to other hardware resource sets of other information handling systems via hardware resources interface (116), network (130), and/or other system control processors of the other information handling systems. The system control processors may cooperatively enable hardware resource sets of other information handling systems to be prepared and presented as bare metal resources to the compute resource set (102).

In an additional example, the system control processors (114) may be operably connected to external resources via hardware resources interface (116) and network (130). The system control processors (114) may prepare and present the external resources as bare metal resources to the compute resource set (102).

The system control processors (114), by presenting resources to the compute resource set (102), may be able to monitor the utilization of the presented resources in a manner that is transparent to the applications or other entities executing using the processors (106), and may manage the states of state dependent hardware devices (e.g., by generating data structures reflecting the states, by modifying the operation of the state dependent hardware devices to conform to states, etc.). Consequently, these entities may not be able to interfere with monitoring of the use of these resources or be aware of any changes in the states of state dependent devices. In contrast, if an agent or other entity for monitoring computing resource use for performance of workloads is executing using the processors (106), other entities executing using the processors (106) may be able to interfere with the operation of the monitoring entity. Accordingly, embodiments of the invention may provide a method of monitoring computing resources used for performing corresponding workloads that is less susceptible to interference by other entities. Similarly, the states of state dependent hardware devices may be managed without interference.

Figure 3:
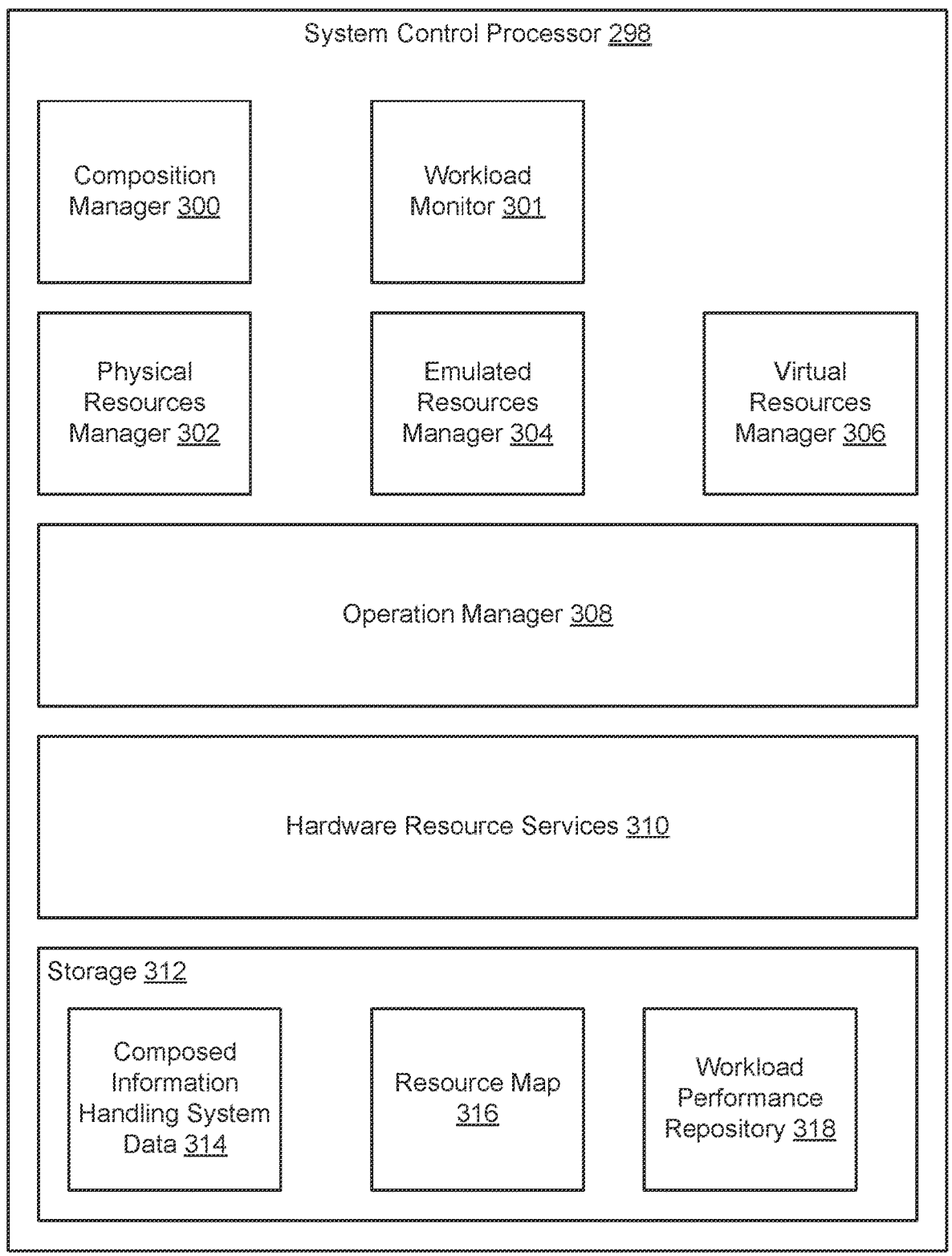
FIG. 3 shows a diagram of a system control processor in accordance with one or more embodiments of the invention.

For additional details regarding the operation and functions of the system control processors (114), refer to FIG. 3.

The compute resources interface (112) may be implemented using any suitable interconnection technology including, for example, system buses such as compute express links or other interconnection protocols. The compute resources interface (112) may support any input/output (IO) protocol, any memory protocol, any coherence interface, etc. The compute resources interface (112) may support processor to device connections, processor to memory connections, and/or other types of connections. The compute resources interface (112) may be implemented using one or more hardware devices including circuitry adapted to provide the functionality of the compute resources interface (112).

The compute resources interface (112) may also support sideband communications between the system control processors (114), the processors (106), and/or the processor dedicated memory (104). Consequently, the system control processors (114) may be able to monitor the operations of these other devices to identify the workloads being performed by composed information handling systems using these hardware devices.

The hardware resources interface (116) may be implemented using any suitable interconnection technology including, for example, system buses such as compute express links or other interconnection protocols. The hardware resources interface (116) may support any input/output (IO) protocol, any memory protocol, any coherence interface, etc. The hardware resources interface (116) may support processor to device connections, processor to memory connections, and/or other types of connections. The hardware resources interface (116) may be implemented using one or more hardware devices including circuitry adapted to provide the functionality of the hardware resources interface (116).

In some embodiments of the invention, the compute resource set (102), control resource set (108), and/or hardware resource set (110) may be implemented as separate physical devices. In such a scenario, the compute resources interface (112) and hardware resources interface (116) may include one or more networks enabling these resource sets to communicate with one another. Consequently, any of these resource sets (e.g., 102, 108, 110) may include network interface cards or other devices to enable the hardware devices of the respective resource sets to communicate with each other.

In one or more embodiments of the invention, the system control processors (114) support multiple, independent connections. For example, the system control processors (114) may support a first network communications connection (e.g., an in-band connection) that may be allocated for use by applications hosted by the processors (106). The system control processors (114) may also support a second network communications connection (e.g., an out-of-band connection) that may be allocated for use by applications hosted by the system control processors (114). The out-of-band connection may be utilized for management and control purposes while the in-band connection may be utilized to provide computer implemented services. These connections may be associated with different network endpoints thereby enabling communications to be selectively directed toward applications hosted by the processors (106) and/or system control processors (114). As will be discussed in greater detail with respect to FIG. 3, the system control processors (114) may utilize the out-of-band connections to communicate with other devices to manage (e.g., instantiate, monitor, modify, etc.) composed information handling systems.

The network (130) may correspond to any type of network and may be operably connected to the Internet or other networks thereby enabling the information handling system (100) to communicate with any number and type of other devices.

The information handling system (100) may be implemented using computing devices. The computing devices may be, for example, a server, laptop computer, desktop computer, node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the information handling system (100) described in this application and/or all, or a portion, of the methods illustrated in FIGS. 5.1-5.2. The information handling system (100) may be implemented using other types of computing devices without departing from the invention. For additional details regarding computing devices, refer to FIG. 7.

While the information handling system (100) has been illustrated and described as including a limited number of specific components, an information handling system in accordance with embodiments of the invention may include additional, fewer, and/or different components without departing from the invention.

Turning to FIG. 2, FIG. 2 shows a diagram of the hardware resources (118) in accordance with one or more embodiments of the invention. As noted above, system control processors of information handling system may present resources including, for example, some of the hardware resources (118) to form a composed information handling system.

The hardware resources (118) may include any number and types of hardware devices that may provide any quantity and type of computing resources. For example, the hardware resources (118) may include storage devices (200), memory devices (202), and special purpose devices (204). The hardware resources (118) may include different numbers and types of devices than those illustrated in FIG. 2 without departing from the invention. Any of the devices may be state dependent or state independent devices.

The storage devices (200) may provide storage resources (e.g., persistent storage) in which applications hosted by a composed information handling system may store data including any type and quantity of information. The storage devices (200) may include any type and quantity of devices for storing data. The devices may include, for example, hard disk drives, solid state drives, tape drives, etc. The storage devices (200) may include other types of devices for providing storage resources without departing from the invention. For example, the storage devices (200) may include controllers (e.g., redundant array of disk controllers), load balancers, and/or other types of devices.

The memory devices (202) may provide memory resources (e.g., transitory and/or persistent storage) in which a composed information handling system may store data including any type and quantity of information. The memory devices (202) may include any type and quantity of devices for storing data. The devices may include, for example, transitory memory such as random access memory, persistent memory such as storage class memory, etc. The memory devices (202) may include other types of devices for providing memory resources without departing from the invention. For example, the storage devices (200) may include controllers (e.g., replication managers), load balancers, and/or other types of devices.

The special purpose devices (204) may provide other types of computing resources (e.g., graphics processing resources, computation acceleration resources, etc.) to composed information handling systems. The special purpose devices (204) may include any type and quantity of devices for providing other types of computing resources. The special purpose devices (204) may include, for example, graphics processing units for providing graphics processing resources, compute accelerators for accelerating corresponding workloads performed by composed information handling systems, application specific integrated circuits (ASICs) for performing other functionalities, digital signal processors for facilitating high speed communications, field programmable gate arrays for providing any type of service, etc. The special purpose devices (204) may include other types of devices for providing other types of computing resources without departing from the invention.

The system control processors of the information handling systems may mediate presentation of the computing resources provided by the hardware resources (118) to computing resource sets (e.g., as bare metal resources to processors). When doing so, the system control processors may provide a layer of abstraction that enables the hardware resources (118) to be, for example, virtualized, emulated as being compatible with other systems, and/or directly connected to the compute resource sets (e.g., pass through). Consequently, the computing resources of the hardware resources (118) may be finely, or at a macro level, allocated to different composed information handling systems.

Additionally, the system control processors may manage operation of these hardware devices in accordance with one or more models including, for example, data protection models (e.g., storing multiple copies of data), security models (e.g., encrypting stored data), workload performance availability models (e.g., reserving state dependent resources as they are deallocated), reporting models (e.g., obtaining information regarding the performance of workloads, health metrics of the hardware devices, etc.), etc. For example, the system control processors may actively monitor the performance of workloads and reserve state dependent hardware devices for future allocation to perform workloads that are suspended.

The manner of operation of these devices may be transparent to the computing resource sets utilizing these hardware devices for providing computer implemented services. Consequently, even though the resulting composed information handling system control plane may be unaware of the implementation of the management of these hardware resources (118), the composed information handling systems may still operate in accordance with these management methods thereby providing a unified method of managing the operation of composed information handling systems.

While the hardware resources (118) have been illustrated and described as including a limited number of specific components, hardware resources in accordance with embodiments of the invention may include additional, fewer, and/or different components without departing from the invention.

As discussed above, information handling systems may include system control processors that may be used to instantiate composed information handling systems. FIG. 3 shows a diagram of a system control processor (298) in accordance with one or more embodiments of the invention. Any of the system control processors included in control resource sets of FIG. 1.2 may be similar to the system control processor (298) illustrated in FIG. 3.

The system control processor (298) may facilitate instantiation, recomposition, and operation of composed information handling systems. By doing so, a system that includes information handling systems may dynamically instantiate and/or recompose composed information handling systems to provide computer implemented services.

To instantiate and operate composed information handling systems, the system control processor (298) may include a composition manager (300), a workload monitor (301), a physical resources manager (302), an emulated resources manager (304), a virtual resources manager (306), an operation manager (308), hardware resource services (310), and storage (312). Each of these components of the system control processor is discussed below.

The composition manager (300) may manage the process of instantiating, recomposing, and operating composed information handling systems. To provide these management services, the composition manager (300) may include functionality to (i) obtain information regarding the hardware components of the information handling system (e.g., obtain telemetry data regarding the information handling system), (ii) provide the obtained information to other entities (e.g., management entities such as system control processor manager (50, FIG. 1.1)), (iii) obtain composition/recomposition requests for composed information handling systems, (iv) based on the composition/recomposition requests, prepare and present resources as bare metal resources to compute resource sets, (v) instantiate applications in composed information handling systems to cause the composed information handling systems to provide computer implemented services, (vi) manage the operation of the composed information handling systems by, for example, managing hardware devices of hardware resource sets in accordance with various management models, (vii) add/remove/modify resources presented to the compute resource sets of composed information handling systems dynamically in accordance with workloads being performed by the composed information handling systems, (viii) reserve state dependent hardware devices for future allocation when they are deallocated, and/or (ix) coordinate with other system control processors to provide distributed system functionalities. By providing the above functionalities, a system control processor in accordance with one or more embodiments of the invention may enable distributed resources from any number of information handling systems to be aggregated into a composed information handling system to provide computer implemented services by performing workloads using computing resources that are dynamically reallocated over time.

To obtain information regarding the hardware components of the information handling system, the composition manager (300) may inventory the components of the information handling system hosting the system control processor. The inventory may include, for example, the type and model of each hardware component, versions of firmware or other code executing on the hardware components, and/or information regarding hardware components (e.g., hardware devices) of the information handling system that may be allocated to form composed information handling systems.

The inventory may also indicate whether each hardware component is a state dependent or state independent hardware component.

The composition manager (300) may obtain composition requests from other entities (e.g., management entities tasked with instantiating composed information handling systems), as pre-loaded instructions present in storage of the system control processor, and/or via other methods. The composition requests may specify, for example, the types and quantities of computing resources to be allocated to a composed information handling system and/or changes in existing computing resource allocations.

In one or more embodiments of the invention, the composition requests specify the computing resource allocations using an intent based model. For example, rather than specifying specific hardware devices (or portions thereof) to be allocated to a particular compute resource set to obtain a composed information handling system, the resource requests may only specify that a composed information handling system is to be instantiated having predetermined characteristics, that a composed information handling system will perform certain workloads or execute certain applications, and/or that the composed information handling system be able to perform one or more predetermined functionalities. In such a scenario, the composition manager may decide how to instantiate the composed information handling system (e.g., which resources to allocate, how to allocate the resources (e.g., virtualization, emulation, redundant workload performance, data integrity models to employ, etc.), to which compute resource set(s) to present corresponding computing resources, etc.).

In one or more embodiments of the invention, the composition requests specify the computing resource allocations using an explicit model. For example, the composition requests may specify (i) the resources to be allocated, (ii) the manner of presentation of those resources (e.g., emulating a particular type of device using a virtualized resource vs. path through directly to a hardware component), and (iii) the compute resource set(s) to which each of the allocated resources are to be presented.

In addition to specifying resource allocations, the composition requests may also specify, for example, applications to be hosted by the composed information handling systems, security models to be employed by the composed information handling systems, communication models to be employed by the composed information handling systems, services to be provided to the composed information handling systems, user/entity access credentials for use of the composed information handling systems, and/or other information usable to place the composed information handling systems into states in which the composed information handling systems provide desired computer implemented services by performing corresponding workloads.

To prepare and present resources to compute resource sets based on the composition requests, the system control processors may implement, for example, abstraction, indirection, virtualization, mapping, emulation, and/or other types of services that may be used to present any type of resources as a resource that is capable of bare metal utilization by compute resource sets. To provide these services, the composition manager (300) may invoke the functionality of the physical resources manager (302), the emulated resources manager (304), and/or the virtual resources manager (306).

When presenting the resources to the compute resource sets, the system control processor (298) may present the resources using an emulated data plane. For example, the system control processors (298) may receive bare metal communications (e.g., IO from the processors) and respond in a manner consistent with responses of corresponding bare metal devices (e.g., memory). When doing so, the system control processor (298) may translate the communications into actions. The actions may be provided to the hardware devices used by the system control processor (298) to present the bare metal resources to the compute resource set(s). In turn, the hardware devices may perform the actions which result in a composed information handling system providing desired computer implemented services.

Additionally, the system control processor (298) may set the states of state dependent devices when presenting them to compute resources. To do so, the system control processor (298) may utilize resumption packages that include information necessary to program a hardware device to operate in accordance with a state or utilize a hardware device that is already in the predetermined state (e.g., if a hardware device is reserved between when previously allocated for performance of a workload and currently allocated for performing the workload). The hardware device may be programmed by sending one or more messages. The messages may cause the hardware device to, for example, populate registered with particular information, modify operational settings, and/or otherwise modify the operation of the hardware device to be in accordance with that expected by the state to which the hardware device is to be matched.

In some scenarios, multiple system control processors may cooperate to present bare metal resources to a compute resource set. For example, a single information handling system may not include sufficient hardware devices to present a quantity and/or types of resources to a compute resource set as specified by composition requests (e.g., present two storage devices to a compute resource set when a single information handling system only includes a single storage device). In this scenario, a second system control processor of a second information handling system operably connected to the system control processor tasked with presenting the resources to a compute resource set may prepare one of its storage devices for presentation. Once prepared, the second system control processor may communicate with the system control processor to enable the system control processor to present the prepared storage device (i.e., the storage device in the information handling system) to the compute resource set. By doing so, resources from multiple information handling systems may be aggregated to present a desired quantity of resources to compute resource set(s) to form a composed information handling system.

By forming composed information handling systems as discussed above, embodiments of the invention may provide a system that is able to effectively utilize distributed resources across a range of devices to provide computer implemented services.

When providing its functionality, the composition manager (300) may perform all, or a portion, of the methods illustrated in FIGS. 5.1-5.2.

After a composed information handling system is formed, a client may begin to utilize the hardware devices of the composed information handling system via use of computer implemented services provided using the hardware devices. The workload monitor (301) may monitor the use of computing resources for providing these services to ascertain whether the workload should be continued to be performed (e.g., if in demand) or suspended (e.g., if not in demand).

To do so, the workload monitor (301) may (i) monitor the components of the compute resource sets including the actions being performed, power being consumed, communications sent, etc., (ii) monitor communications from the compute resource sets destined for other hardware devices (e.g., of hardware resource sets, other compute resource sets of other information handling systems, external resources, etc.) by intercepting them as they traverse the system control processor (298), (iii) store information regarding the use of computing resources for performing workloads overtime in a workload performance repository (318), (iv) provide workload performance information to other entities such as system control processor managers, and (v) perform other actions under the direction of management entities to help the management entities (e.g., system control processor managers) to determine whether to continue or suspend performance of any workloads. Consequently, the management entities may be better able to allocate the limited computing resources of the system of FIG. 1.1 for providing computer implemented services as the demand for various workloads ebbs and flows over time. The resulting computer implemented services may be of a higher quality, may limit or prevent phantom slowdowns due to lack of computing resources for performance of workloads, and/or may otherwise improve a quality of a user's experience regarding the provided computer implemented services.

When providing its functionality, the workload monitor (301) may perform all, or a portion, of the methods illustrated in FIGS. 5.1-5.2.

The physical resources manager (302) may manage presentation of resources to compute resource sets. For example, the physical resources manager (302) may generate, for example, translation tables that specify actions to be performed in response to bare metal communications obtained from compute resource sets. The translation tables may be used to take action in response to communications from compute resource sets.

The physical resources manager (302) may generate the translation tables based on the components of the compute resource sets, allocations or other types of commands/communications obtained from the compute resource sets, and the resources of the information handling system allocated to service the compute resource set. For example, when a compute resource set is presented with a bare metal resource, it may go through a discovery process to prepare the bare metal resource for use. As the discovery process proceeds, the compute resource set may send commands/communications to the bare metal resource to, for example, discover its address range. The physical resources manager (302) may monitor this process, respond appropriately, and generate the translation table based on these commands and the resources available to service these bare metal commands/communications.

For example, consider a scenario where a virtualized disk is allocated to service bare metal storage commands from a compute resource set. In such a scenario, the physical resources manager (302) may generate a translation table that translates physical write from the compute resource set to virtualized writes corresponding to the virtualized disk. Consequently, the virtualized disk may be used by the system control processor (298) to present bare metal resources to the compute resource set.

The physical resources manager (302) may also manage the states of state dependent hardware devices. For example, the physical resources manager (302) may set the states of the state dependent hardware devices, may cause information (e.g., resumption packages) reflecting the states of hardware devices to be obtained and/or provided to other entities such as system control processor managers. Consequently, as state dependent hardware devices are allocated to or deallocated from a composed information handling system, the physical resources manager (302) may ensure that the states and information regarding the states of the state dependent devices is maintained.

The emulated resources manager (304) may generate emulation tables that enable resources that would otherwise be incompatible with a compute resource set to be compatible with the compute resource set. Different types of hardware devices of a compute resource set may be compatible with different types of hardware devices. Consequently, resources allocated to provide bare metal resources may not necessarily be compatible with the hardware devices of a compute resource set. The emulated resources manager (304) may generate emulation tables that map bare metal communications obtained from a compute resource set to actions that are compatible with resources allocated to provide bare metal resources to the compute resource sets.

The virtual resources manager (306) may manage virtualized resources that may be allocated to provide bare metal resources to compute resource sets. For example, the virtual resources manager (306) may include hypervisor functionality to virtualized hardware resources and allocate portions of the virtualized resources for use in providing bare metal resources.

While the physical resources manager (302), emulated resources manager (304), and virtual resources manager (306) have been described as generating tables, these components of the system control processor may generate other types of data structures or utilize different management models to provide their respective functionalities without departing from the invention.

The functionalities of the physical resources manager (302), emulated resources manager (304), and virtual resources manager (306) may be utilized in isolation and/or combination to provide bare metal resources to compute resource sets. By doing so, the system control processor (298) may address compatibility issues, sizing issues to match available resources to those that are to be allocated, and/or other issues to enable bare metal resources to be presented to compute resource sets.

When providing bare metal resources, the composition manager (300) may invoke the functionality of the physical resources manager (302), emulated resources manager (304), and virtual resources manager (306). Consequently, resources may be presented as bare metal resources via pass-through (i.e., forwarding IO from compute resource sets to hardware devices), bare metal resource addressing of virtualized resources, and/or as emulated resources compatible with the hardware components of the compute resource set.

The functionality of the physical resources manager (302), emulated resources manager (304), and virtual resources manager (306) may be invoked using any communication model including, for example, message passing, state sharing, memory sharing, etc.

The operation manager (308) may manage the general operation of the system control processor (298). For example, the operation manager (308) may operate as an operating system or other entity that manages the resources of the system control processor (298). The composition manager (300), workload monitor (301), physical resources manager (302), emulated resources manager (304), virtual resources manager (306), and/or other entities hosted by the system control processor (298) may call or otherwise utilize the operation manager (308) to obtain appropriate resources (e.g., processing resources, memory resources, storage, communications, etc.) to provide their functionalities.

The hardware resource services (310) may facilitate use of the hardware components of any number of hardware resource sets (e.g., 110, FIG. 1.1). For example, the hardware resource services (310) may include driver functionality to appropriately communicate with the hardware devices of hardware resource sets. The hardware resource services (310) may be invoked by, for example, the operation manager (308).

When providing their functionalities, any of the aforementioned components of the system control processor (298) may perform all, or a portion, of the methods illustrated in FIGS. 5.1-5.2.

The system control processor (298) may be implemented using computing devices. The computing devices may be, for example, an embedded computing device such a system on a chip, a processing device operably coupled to memory and storage, or another type of computing device. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the system control processor (298) described in this application and/or all, or a portion, of the methods illustrated in FIGS. 5.1-5.2. The system control processor (298) may be implemented using other types of computing devices without departing from the invention. For additional details regarding computing devices, refer to FIG. 7.

In one or more embodiments of the invention, the system control processor (298) is implemented as an on-board device. For example, the system control processor (298) may be implemented using a chip including circuitry disposed on a circuit card. The circuit card may also host the compute resource sets and/or hardware resource sets managed by the system control processor (298).

In one or more embodiments of the invention, any of the composition manager (300), workload monitor (301), physical resources manager (302), emulated resources manager (304), virtual resources manager (306), operation manager (308), and/or hardware resource services (310) are implemented using a hardware device including circuitry. The hardware device may be, for example, a digital signal processor, a field programmable gate array, or an application specific integrated circuit. The circuitry may be adapted to cause the hardware device to perform the functionality of the composition manager (300), workload monitor (301), physical resources manager (302), emulated resources manager (304), virtual resources manager (306), operation manager (308), and/or hardware resource services (310). The composition manager (300), workload monitor (301), physical resources manager (302), emulated resources manager (304), virtual resources manager (306), operation manager (308), and/or hardware resource services (310) may be implemented using other types of hardware devices without departing from the invention.

In one or more embodiments of the invention, any of the composition manager (300), workload monitor (301), physical resources manager (302), emulated resources manager (304), virtual resources manager (306), operation manager (308), and/or hardware resource services (310) are implemented using a processor adapted to execute computing code stored on a persistent storage (e.g., as part of the system control processor (298) or operably connected to the system control processor (298) thereby enabling processors of the system control processor (298) to obtain and execute the computing code) that when executed by the processor performs the functionality of the composition manager (300), workload monitor (301), physical resources manager (302), emulated resources manager (304), virtual resources manager (306), operation manager (308), and/or hardware resource services (310). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (312) is implemented using physical devices that provide data storage services (e.g., storing data and providing copies of previously stored data). The devices that provide data storage services may include hardware devices and/or logical devices. For example, storage (312) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (312) may include a memory device (e.g., a dual in line memory device) in which data is stored and from which copies of previously stored data are provided. In another example, storage (312) may include a persistent storage device (e.g., a solid-state disk drive) in which data is stored and from which copies of previously stored data is provided. In a still further example, storage (312) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (312) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (312) may store data structures including, for example, composed information handling system data (314), a resource map (316), and a workload performance repository (318). Each of these data structures is discussed below.

The composed information handling system data (314) may be implemented using one or more data structures that includes information regarding composed information handling systems. For example, the composed information handling system data (314) may specify identifiers of composed information handling systems and resources that have been allocated to the composed information handling systems.

The composed information handling system data (314) may also include information regarding the operation of the composed information handling systems. The information may include, for example, workload performance data, resource utilization rates over time, and/or other information that may be utilized to manage the operation of the composed information handling systems.

The composed information handling system data (314) may further include information regarding management models employed by system control processors. For example, the composed information handling system data (314) may include information regarding duplicative data stored for data integrity purposes, redundantly performed workloads to meet high availability service requirements, encryption schemes utilized to prevent unauthorized access of data, etc.

The composed information handling system data (314) may be maintained by, for example, the composition manager (300). For example, the composition manager may add, remove, and/or modify information included in the composed information handling system data (314) to cause the information included in the composed information handling system data (314) to reflect the state of the composed information handling systems.

The data structures of the composed information handling system data (314) may be implemented using, for example, lists, tables, unstructured data, databases, etc. While illustrated in FIG. 3 as being stored locally, the composed information handling system data (314) may be stored remotely and may be distributed across any number of devices without departing from the invention.

The resource map (316) may be implemented using one or more data structures that include information regarding resources of the information handling system and/or other information handling systems. For example, the resource map (316) may specify the type and/or quantity of resources (e.g., hardware devices, virtualized devices, etc.) available for allocation and/or that are already allocated to composed information handling systems. The resource map (316) may be used to provide data to management entities such as system control processor managers.

The data structures of the resource map (316) may be implemented using, for example, lists, tables, unstructured data, databases, etc. While illustrated in FIG. 3 as being stored locally, the resource map (316) may be stored remotely and may be distributed across any number of devices without departing from the invention.

The resource map (316) may be maintained by, for example, the composition manager (300). For example, the composition manager (300) may add, remove, and/or modify information included in the resource map (316) to cause the information included in the resource map (316) to reflect the state of the information handling system and/or other information handling systems.

The workload performance repository (318) may be implemented using one or more data structures that includes information regarding the computing resources utilized to perform workloads hosted by composed information handling systems over time. For example, the workload performance repository (318) may specify identifiers of workloads, identifiers of hardware components used to perform the workloads, and other types of information that may be used to establish relationships between workloads and the computing resources used to perform the workloads over time.

The workload performance repository (318) may specify the use of computing resources to perform workloads over time via any method. For example, the workload performance repository (318) map may specify a quantity of computing resources utilized at various points in time, computing resource utilization rates over time, power consumption of hardware devices that provide the computing resources used to perform workloads, etc. The workload performance repository (318) may include other types of information used to quantify the use of computing resources for performing workloads without departing from the invention.

The workload performance repository (318) may be maintained by, for example, the workload monitor (301). For example, the workload monitor (301) may add, remove, and/or modify information included in the workload performance repository (318) to cause the information included in the workload performance repository (318) to reflect the consumption of computing resource for performing workloads over any period(s) of time. Consequently, the information included in the workload performance repository (318) may indicate the relative level of demand for various computer implemented services and corresponding workloads.

The data structures of the workload performance repository (318) may be implemented using, for example, lists, tables, unstructured data, databases, etc. While illustrated in FIG. 3 as being stored locally, the workload performance repository (318) may be stored remotely and may be distributed across any number of devices without departing from the invention.

While the storage (312) has been illustrated and described as including a limited number and type of data, a storage in accordance with embodiments of the invention may store additional, less, and/or different data without departing from the invention.

While the system control processor (298) has been illustrated and described as including a limited number of specific components, a system control processor in accordance with embodiments of the invention may include additional, fewer, and/or different components without departing from the invention.

Figure 4:
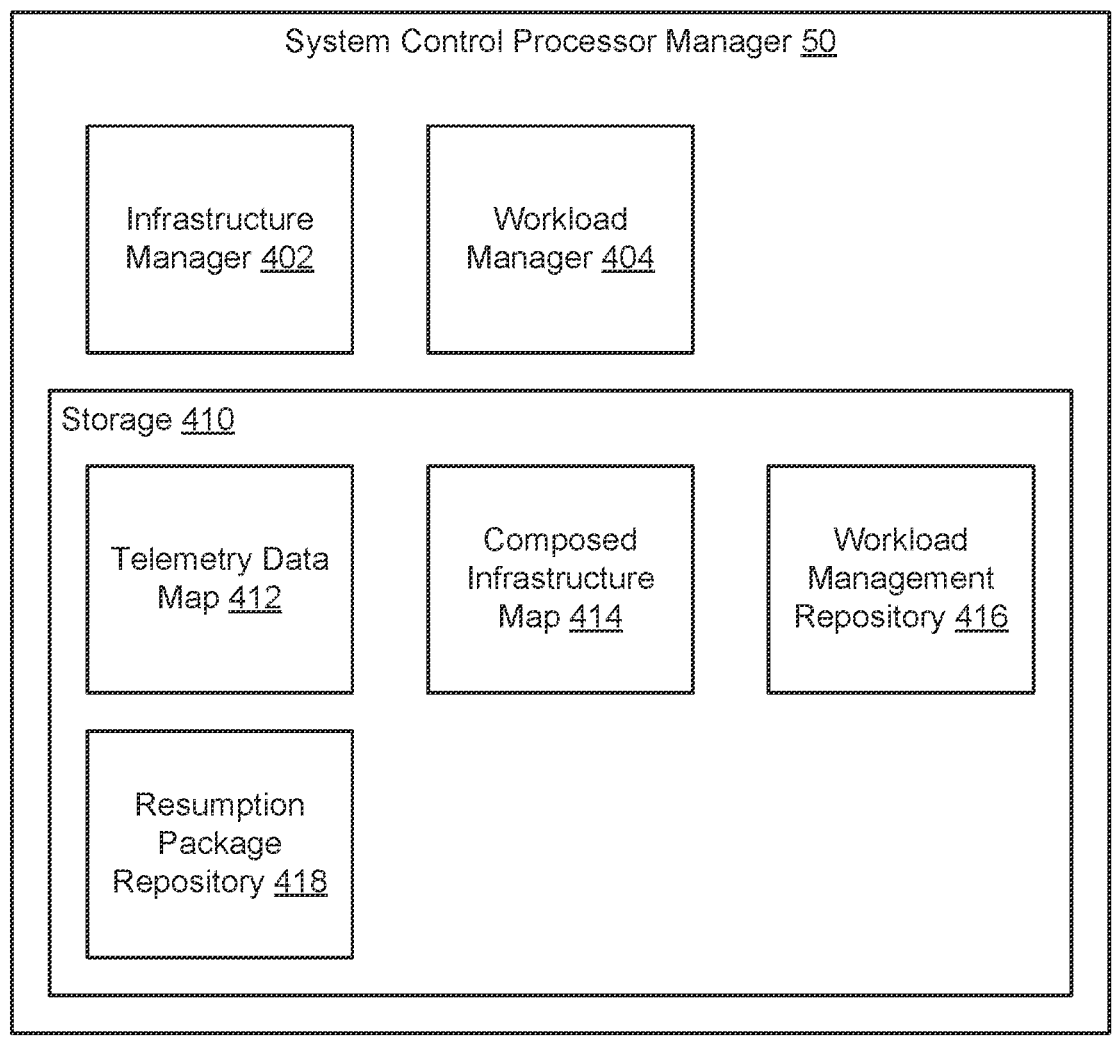
FIG. 4 shows a diagram of a system control processor manager in accordance with one or more embodiments of the invention.

As discussed above, a system control processor manager may cooperate with system control processors of control resource sets to instantiate and/or recompose composed information handling systems by presenting computing resources from hardware resource sets to processors of compute resource sets as bare metal resources. FIG. 4 shows a diagram of the system control processor manager (50) in accordance with one or more embodiments of the invention.

The system control processor manager (50) may manage the process of instantiating and/or recomposing composed information handling systems to manage the performance of workloads for computer implemented services. To do so, the system control processor manager (50) may include an infrastructure manager (402), workload manager (404), and storage (410). Each of these components is discussed below.

The infrastructure manager (402) may provide composition and/or recomposition services. These services may include obtaining composition/recomposition requests for composed information handling systems, determining the resources to allocate to instantiate/recompose composed information handling systems, cooperating with system control processors to allocate the identified resources, deallocating computing resources from composed information handling systems when demand for workload performed by these systems is low (e.g., falls below a threshold or other condition), and managing computing resources that are not allocated by assigning them to different pools that govern (e.g., limit/restrict) whether the resources can be allocated for different purposes. By doing so, the infrastructure manager (402) may cause any number of computer implemented services to be provided using the composed information handling systems by managing performance of corresponding workloads for the computer implemented services and allocations for performing of the workloads.

To determine the resources to allocate to composed information handling systems, the infrastructure manager (402) may employ an intent based model that translates an intent expressed in a composition request to one or more allocations of computing resources. For example, the infrastructure manager (402) may utilize an outcome based computing resource requirements lookup table to match an expressed intent to resources to be allocated to satisfy that intent. The outcome based computing resource requirements lookup table may specify the type, quantity, method of management, and/or other information regarding any number of computing resources that when aggregated will be able to satisfy a corresponding intent. The infrastructure manager (402) may identify resources for allocation to satisfy composition requests via other methods without departing from the invention.

To cooperate with the system control processors, the infrastructure manager (402) may obtain telemetry data regarding the computing resources of any number of information handling systems and/or external resources that are available for allocation. The infrastructure manager (402) may aggregate this data in a telemetry data map (412) which may be subsequently used to identify resources of any number of information handling systems and/or external resources to satisfy composition requests (e.g., instantiate one or more composed information handling systems to meet the requirements of the composition requests, recompose existing composed information handling systems).

When determining the resources to allocate to composed information handling systems, the infrastructure manager (402) may take into account limitations placed upon different computing resources based on their membership in corresponding pools. Different pools may have different limits on when and how computing resources can be allocated. For example, some pools may limit allocation of computing resources that are members of those pools to only for the performance of specific types of workloads. Consequently, the computing resources that may be allocated to a composed information handling system (e.g., for instantiation and/or recomposition) may be more limited than to those that are not yet allocated.

When the infrastructure manager (402) identifies the computing resources to be allocated, the infrastructure manager (402) may communicate with any number of system control processors to implement the identified allocations. For example, the infrastructure manager (402) may notify a system control processor of a control resource set that portions of a hardware resource set are to be allocated to a compute resource set to instantiate a composed information handling system. The system control processor may then take action (e.g., prepare the portion of the hardware resource set for presentation to a processor of the compute resource set) in response to the notification.

As composed information handling systems are instantiated, the infrastructure manager (402) may add information reflecting the resources allocated to composed information handling systems, the workloads being performed by the composed information handling systems, and/or other types of information to a composed infrastructure map (414). The infrastructure manager (402) and/or workload manager (404) may utilize this information to, for example, decide whether computing resources should be added to or removed from composed information handling systems. Consequently, computing resources may be dynamically re-provisioned to meet changing workloads imposed on composed information handling systems.

In one or more embodiments of the invention, the infrastructure manager (402) is implemented using a hardware device including circuitry. The hardware device may be, for example, a digital signal processor, a field programmable gate array, or an application specific integrated circuit. The circuitry may be adapted to cause the hardware device to perform the functionality of the infrastructure manager (402). The infrastructure manager (402) may be implemented using other types of hardware devices without departing from the invention.

In one or more embodiments of the invention, the infrastructure manager (402) is implemented using a processor adapted to execute computing code stored on a persistent storage that when executed by the processor performs the functionality of the infrastructure manager (402). The processor may be a hardware processor including circuitry such as, for example, a central processing unit or a microcontroller. The processor may be other types of hardware devices for processing digital information without departing from the invention.

When providing its functionality, the infrastructure manager (402) may perform all, or a portion, of the methods illustrated in FIGS. 5.1-5.2.

The workload manager (404) may provide computing resource allocation management services. Computing resource allocation management services may include (i) obtaining information regarding performance of workloads that may be used to ascertain the demand for such services, (ii) allocate and/or deallocate computing resources based on the obtained information, and (iii) maintain information usable for state management purposes of state dependent hardware components. By doing so, the workload manager (404) may improve the allocation of resources for providing computer implemented services.

The workload manager (404) may obtain information regarding the performance of workloads from system control processors. For example, the system control processors of composed information handling systems may report such information to the system control manager. Once obtained, the workload manager (404) may store the workload performance information in a workload management repository (416).

The workload manager (404) may ascertain whether to allocate computing resources to or deallocate computing resources from composed information handling systems based on the demand for such services as indicated by the information included in the workload management repository (416). For example, the workload manager (404) may monitor the information included in the workload management repository (416) to identify if the demand for one or more workloads triggers an allocation or deallocation of resources. The identification may be made by, for example, comparing the actual demand to predetermined threshold or other types of trigger conditions.

When an allocation is triggered, the workload manager (404) may invoke the functionality of the infrastructure manager (402) to identify and allocate computing resources to a composed information handling system that already is or will perform the workload that triggered the allocation. For example, a new composed information handling system may be instantiated, or additional computing resources may be allocated to an existing instance of a composed information handling system performing the workload.

When a deallocation is triggered, the workload manager (404) may invoke the functionality of the infrastructure manager (402) to identify and deallocate computing resources from a composed information handling system performing the workload that triggered the deallocation. When deallocation occurs, a resumption package may be generated and stored in a resumption package repository (418) for any state dependent hardware devices that are deallocated. Additionally, when a deallocation occurs, information reflecting a reservation state (e.g., to which pool the newly free resource is a member) of each deallocated computing resource may be added to the workload management repository (416).

The aforementioned assignment to a resource pool may form a reservation system for managing the allocation of computing resources. The reservation system may limit the ability of any number of hardware devices to be allocated based on workloads that will be performed by the system to which the hardware devices may be allocated. For example, when a state dependent hardware device that is performing a workload is deallocated, a resumption package may be added to the resumption package repository (418) and the state dependent hardware device may be added to a reserved pool for the workload that was being performed prior to deallocation. Consequently, the state dependent hardware components will be reserved for allocation only to that workload in the future while other hardware components may be assigned to freely allocable pools thereby enabling them to be allocated for the performance of any type of workload.

When providing its functionality, the workload manager (404) may perform all, or a portion, of the methods illustrated in FIGS. 5.1-5.2.

In one or more embodiments disclosed herein, the storage (410) is implemented using physical devices that provide data storage services (e.g., storing data and providing copies of previously stored data). The devices that provide data storage services may include hardware devices and/or logical devices. For example, storage (410) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (410) may include a memory device (e.g., a dual in line memory device) in which data is stored and from which copies of previously stored data are provided. In another example, storage (410) may include a persistent storage device (e.g., a solid-state disk drive) in which data is stored and from which copies of previously stored data are provided. In a still further example, storage (410) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (410) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (410) may store data structures including, for example, the telemetry data map (412), composed infrastructure map (414), the workload management repository (416), and the resumption package repository (418). These data structures may be maintained by, for example, the infrastructure manager (402) and/or the workload manager (404). For example, the infrastructure manager (402) and/or workload manager (404) may add, remove, and/or modify information included in these data structures to cause the information included in these data structures to reflect the state of any number of information handling systems, external resources, and/or composed information handling systems.

In some embodiments of the invention, the workload management repository (416) may include tables that specify (i) workload demand and (ii) limitations regarding the allocation of computing resources. For example, consider Table 1 which shows a portion of a workload based reservation table. The workload based reservation table includes limitations in column 2 applied to hardware devices listed in column 1. As seen in row 2, compute accelerator 1 is limited to allocation to composed information handling systems that are performing a database workload (e.g., the workload being performed using the compute accelerator prior to being deallocated from an existing composed information handling system). In contrast, row 3 indicates that processor 1 may be freely allocated to any composed information handling system performing any workload.

TABLE 1

| Example workload based reservation table | |
| --- | --- |
| Hardware Device | Limitations |
| Compute Accelerator 1 | Reserved for Database Workload |
| Processor 1 | Freely allocable |

In another example, consider Table 2 which shows a portion of a workload demand table. The workload demand table includes, in column 3, the number of instances of workloads specified in column 1. The workload demand table also specifies, based on monitoring of the workload performance, the demand for each respective workload in column 2. As seen in the example in Table 2, there is high demand for instant message workloads but low demand for database workloads while similar number of instances exist. In this example, the workload manager (404) would take action to reduce the number of instances of the database workload by suspending one or more of the workloads and deallocate computing resources from the composed information handling system(s) performing the suspended workloads. Consequently, the workload manager (404) may update Table 1 to reflect that the deallocated computing resources are now free but may be subject to allocation limitations if appropriate (e.g., if a state dependent hardware device is deallocated).

TABLE 2

Example workload based reservation table

| Workload | Demand | Instances |
|---|---|---|
| Instant Message | High | 3 |
| Database | Low | 3 |

The resumption package repository (418) may include any number of resumption packages usable to place state dependent hardware devices into states that allow workloads that were previously being performed and suspended to be resumed. For example, a resumption package may include information usable to program a state dependent device to have it resume a previous state. The resumption package repository (418) may include any number and type of resumption packages (e.g., data structures).

Any of these data structures may be implemented using, for example, lists, tables, unstructured data, databases, etc. While illustrated in FIG. 4 as being stored locally, any of these data structures may be stored remotely and may be distributed across any number of devices without departing from the invention.

While the storage (410) has been illustrated and described as including a limited number and type of data, a storage in accordance with embodiments of the invention may store additional, less, and/or different data without departing from the invention.

While the system control processor manager (50) has been illustrated and described as including a limited number of specific components, a system control processor manager in accordance with embodiments of the invention may include additional, fewer, and/or different components than those illustrated in FIG. 4 without departing from the invention.

As discussed above, the system of FIG. 1.1 may provide computer implemented services using composed information handling system by dynamically allocating and deallocating computing resources for the composed information handling systems. FIG. 5.1 shows a flowchart of a method in accordance with one or more embodiments of the invention. The method depicted in FIG. 5.1 may be performed to deallocate computing resources from a composed information handling system in accordance with one or more embodiments of the invention. The method shown in FIG. 5.1 may be performed by, for example, a system control processor manager (e.g., 50, FIG. 1.1). Other components of the system in FIG. 1.1 may perform all, or a portion, of the method of FIG. 5.1 without departing from the invention.

While FIG. 5.1 is illustrated as a series of steps, any of the steps may be omitted, performed in a different order, additional steps may be included, and/or any or all of the steps may be performed in a parallel and/or partially overlapping manner without departing from the invention.

In step 500, the performance of workloads by composed information handling systems is monitored to obtain performance information. The workloads may be monitored by obtaining workload performance information from system control processor of the composed information handling systems. The performance information may indicate the demand for the workloads.

In step 502, it is determined whether performance of one or more of the workloads should be suspended based on the performance information. The determination may be made by, for example, comparing the performance information to one or more criteria that specify whether performance of the one or more workloads should be suspended.

For example, the criteria may specify that when the demand for a workload falls below a predetermined threshold, then performance of the one or more workloads should be suspended. The determination may be made using other types of criteria without departing from the invention.

If it is determined that performance of the one or more workloads should be suspended, then the method may proceed to step 504. Otherwise the method may end following step 502.

In step 504, a resumption package for the composed information handling system performing the one or more workloads is generated. The resumption package may be obtained by instructing a system control processor of the composed information handling system to generate the resumption package. The resumption package may include any quantity of information that may be used to restore a state of one or more state dependent hardware devices of the composed information handling system. The state to which the state dependent hardware devices may be restored may be the state of the aforementioned state dependent hardware devices immediately preceding suspension of performance of the computer implemented services (e.g., a deallocation state).

In step 506, at least one computing resource of the composed information handling system is deallocated to a reserved pool. The at least one computing resource may be the one or more state dependent hardware devices for which resumption packages were generated in step 504.

Deallocating the at least one computing resource may cause the composed information handling system to release the at least one computing resource. In other words, the composed information handling system may no longer use it.

The at least one computing resource may be deallocated by instructing the system control processor of the composed information handling system to release the at least one computing resource. In response, the system control processor may remove the at least one computing resource from visibility by the composed information handling system. The system control processor may do so, for example, in accordance with a device management model operated by the control plane of the composed information handling system. Consequently, the release of the at least one computing resource may be an elegant release in accordance with the operation control plane entities.

The reserved pool may specify that members of the reserved pool may only be allocated for the performance of workloads which were previously being performed by the members of the reserved pool. Deallocating the at least one computing resource to the reserved pool, consequently, reserved the at least one computing resources for future allocation for resumption of performance of the workload suspended in step 502.

In step 508, the remaining computing resources of the composed information handling system are deallocated to a freely allocable pool. The remaining computing resources may correspond to all of the remaining computing resources of the composed information handling system or a subset of all of the remaining computing resources of the composed information handling system (in a scenario where preservation of some functionality of the composed information handling system is desired).

The deallocating the remaining computing resources of the composed information handling system may terminate execution of the one of the workloads suspended in step 502.

The remaining computing resources may be deallocated in a manner similar to that described with respect to step 506. However, the remaining computing resources may be deallocated to the freely allocable pool which does not place restrictions on allocation of the remaining computing resources. Consequently, once deallocated to the freely allocable pool, the remaining computing resources may be allocated to other composed information handling systems performing other types of workloads.

The method may end following step 508.

Using the method illustrated in FIG. 5.1, computing resources may be deallocated from a composed information handling system in a manner that is likely to enable performance of workloads that were suspended due to the deallocation to be quickly and efficiently resumed. For example, by reserving some computing resources and obtaining a corresponding resumption package, a new composed information handling system may be instantiated in a state consistent with the state of the composed information handling system for which the resumption package was generated.

For example, the resumption package may include a table of data usable to program one or more hardware devices to place them into predetermined states. In the case of, for example, a graphics processing unit, the table may include information necessary to populate shaders or other atomic processing units necessary to resume repetitive calculations.

Turning to FIG. 5.2, FIG. 5.2 shows a flowchart of a method in accordance with one or more embodiments of the invention. The method depicted in FIG. 5.2 may be performed to allocate computing resources to a composed information handling system in accordance with one or more embodiments of the invention. The method shown in FIG. 5.2 may be performed by, for example, a system control processor manager (e.g., 50, FIG. 1.1). Other components of the system in FIG. 1.1 may perform all, or a portion, of the method of FIG. 5.2 without departing from the invention.

While FIG. 5.2 is illustrated as a series of steps, any of the steps may be omitted, performed in a different order, additional steps may be included, and/or any or all of the steps may be performed in a parallel and/or partially overlapping manner without departing from the invention.

In step 510, an occurrence of a workload resumption event is identified. The occurrence may be, for example, the demand for the workload (for which performance has been suspended) meeting one or more criteria. The workload resumption event may be identified based on changes in the demand for the workload over time (e.g., an increase in demand for the workload). As discussed with respect to FIG. 5.1, the demand for various workloads over time may be monitored. Consequently, changes in demand may be determined based on the monitoring.

In step 512, at least one computing resource of a reserved pool is allocated to a new composed information handling system. The at least one computing resource may be a state dependent hardware device. The state dependent hardware device may have been performing the workload prior to performance of the workload being suspended (e.g., via step 502).

The at least one computing resource may be allocated by sending allocation instructions to a system control processor of the new composed information handling system. In response, the system control processor may, as discussed with respect to FIG. 3, prepare and present the at least one computing resource to other computing resources of the composed information handling system.

In step 514, other computing resources are allocated to the new composed information handling system from a freely allocable pool. The other computing resources may be allocated similarly to the at least one computing resource of the reserved pool. However, there may be no limitation on whether the other computing resources were previously used to perform the workload. The other computing resources may be state independent computing resources such as, for example, processors or memory. Accordingly, the other computing resources may have been utilized to perform other types of workloads prior to being allocated to the new composed information handling system.

After the at least one computing resource and the other computing resources are allocated to the new composed information handling system, the new composed information handling system may be capable of operating. However, the state of one or more state dependent hardware devices that have been allocated to the new composed information handling system may be different from previous states of the state dependent hardware devices (e.g., due to intention or unintentional state loss such as power cycling of the state dependent hardware devices).

In step 516, the state of a composed information handling system is restored using the new composed information handling system and a resumption package to obtain a resumed composed information handling system. The state may be restored by programming the at least one computing resource using the state resumption package. By doing so, the at least one computing resource of the reserved pool may be placed in a state in which it was previously operating to service the workload. Consequently, the state of the new composed information handling system may match the state of the composed information handling system prior to its computing resources being deallocated. Accordingly, when the resumed composed information handling system begins to operate, it may do so as though nothing had happened prior to its computing resources being deallocated from it.

In step 518, a workload associated with the resumption event is performed using the resumed composed information handling system to provide computer implemented services. The workload associated with the resumption event may have been previously suspended from performance. By performing the workload using the resumed composed information handling system, the computer implemented services may be desirable because they may match that which would have been provided by the workload prior to it being suspended from performance.

The method may end following step 518.

Using the method illustrated in FIG. 5.2, embodiments of the invention may enable workloads that have previously been suspended from performance to resume performance. The system may do so using reserved resources and/or information regarding the previous states of state dependent hardware devices used to perform the workloads.

To further clarify embodiments of the invention, a non-limiting example is provided in FIGS. 6.1-6.4. FIGS. 6.1-6.4 show a system similar to that illustrated in FIG. 1.1. Actions performed by components of the illustrated system are illustrated by numbered, circular boxes interconnected, in part, using dashed lines. For the sake of brevity, only a limited number of components of the system of FIG. 1.1 is illustrated in FIGS. 6.1-6.4.

EXAMPLE

Consider a scenario as illustrated in FIG. 6.1 in which a client (602), at step 1, sends a service request to a system control processor manager (600) that manages two information handling systems (610, 620). The service request specifies that database services are to be provided for the client.

In response to the composition request, the system control processor manager (600), at step 2, translates the intent of the client (e.g., to obtain database services) into a listing of computing resources for a composed information handling system to provide the services. The listing includes the system control processor (614), compute resource set A (612), and compute acceleration unit (616) of the information handling system A (610).

Based on the listing, the system control processor manager (600), at step 3, generates and sends a composition request to the system control processor (614) of the information handling system A (610) indicating compute resource set A (612) is to be presented with the compute acceleration unit (616) to instantiate a composed information handling system to provide the database services.

In response to the instructions, at step 4, the system control processor (614) identifies that the compute acceleration unit (616) is to be presented to the compute resource set A (612). To prepare the compute acceleration unit (616) for allocation, at step 5, the system control processor (614) sets the state of the compute acceleration unit (616) consistent with drivers employed by the system control processor (614) for communications purposes. The system control processor (614) then allocates the compute acceleration unit (616) to the composed information handling system in step 6.

Once the compute acceleration unit (616) is prepared for presentation, the system control processor (614) at step 7, presents the compute acceleration unit (616) as bare metal resources to the compute resource set A (612). Consequently, at step 8, the compute resource set A (612) identifies and begins to use the compute acceleration unit (616) by offloading database related tasks to the compute acceleration unit (616). Accordingly, the composed system begins to provide the requested database services to the client (602). When doing so, the state of the compute acceleration unit (616) changes over time to provide its functionality. Consequently, the operation of the compute acceleration unit (616) becomes dependent upon its state.

Turning to FIG. 6.2, as time passes, the demand for the database services begins to fall. In response, at step 9, the system control processor manager (600), determines that the composed system should be deallocated to free computing resources for the performance of other tasks due to the low demand for the database services. To do so, the system control processor manager (600), at step 10, sends deallocation instructions to the system control processor (614).

In response to the deallocation instructions, the system control processor (614), at step 11, prepares to deallocate the compute acceleration unit (616) by generating a resumption package for the compute acceleration unit. Once the resumption package is generated and stored for future use, the system control processor (614), in step 12, deallocates the compute acceleration unit (616) to a reserved pool for the database services.

In step 13, the system control processor (614) determines that the compute resource set A (612) is not state dependent. Consequently, in step 14, the system control processor (614) deallocates the compute resource set A (612) to a freely allocable pool which includes all of the resources (e.g., 622, 624, 626) of the information handling system B (620).

Turning to FIG. 6.3, the system control processor manager (600), in step 15, determines that the demand for instant messaging services has increased thereby triggering a resumption of previously suspended instant messaging services. Accordingly, in step 16, the system control processor manager (600) instructs the system control processor (614) to instantiate a composed information handling system using the compute resource set A (612) to provide the instant messaging services.

In step 17, the system control processor (614) prepares the compute resource set A (612) for allocation because the compute resource set A (612) is in the freely allocable pool of computing resources. In step 18, the compute resource set A (612) is allocated to the new composed information handling system instance which begins to provide the instant messaging services.

Turning to FIG. 6.4, as time passes the demand for the database services increases which causes the system control processor manager (600) to determine that the previously suspended database workload should be resumed. In response, at step 19, the system control processor identifies that the compute acceleration unit (616) and system control processor (614) are available for allocation. As noted above, the compute acceleration unit (616) was deallocated to the reserved pool thereby reserving it for resumption while, in contrast, the compute resource set A (612) has already been reallocated for other purposes.

Based on the identification of the compute acceleration unit (616), the system control processor manager (600), in step 20, generates and sends allocation instructions to the system control processor (614). The allocation instructions specify that the system control processor (614) is to be allocated to a new composed information handling system to provide the resumed database services.

In response, the system control processor (614), in step 21, programs the compute acceleration unit (616) using the resumption package to place it in a state consistent with resumption of the database services.

In step 22, the system control processor manager (600) identifies that all of the resources of the information handling system B (620) are free (i.e., members in the freely allocable resource pool), including the compute resource set B (622), the system control processor (624), and the storage class memory (626). Accordingly, the system control processor manager (600), in step 23, generates a second composition request which is provided to the system control processor (624). The second composition request specifies that the compute resource set B (622) is to be allocated to the new instance of the composed information handling system.

In response, at step 24, the system control processor (624) presents the compute acceleration unit (616) to the compute resource set B (622) as bare metal resources thereby instantiating the new instance of the composed information handling system in a state consistent with resumption of the database services. Accordingly, the new composed information handling system is able to immediately resume performance of the database services by virtue of the state of the compute acceleration unit (616).

End of Example

Thus, as illustrated in FIGS. 6.1-6.4, embodiments of the invention may provide a system that enables computing resources to be efficiently used to provide desired computer implemented services by tailoring the quantity of computer implemented services allocated for providing the computer implemented services to match the computing resource requirements for providing the computer implemented services over time. As the demand for the services change over time, various computing resources may be deallocated to free them for reallocation while some of the deallocated resources may be reserved for future reallocation for providing the services. Consequently, services that have been temporarily suspended may be resumed quickly while still allowing computing resources to be reallocated for other purposes.

Figure 7:
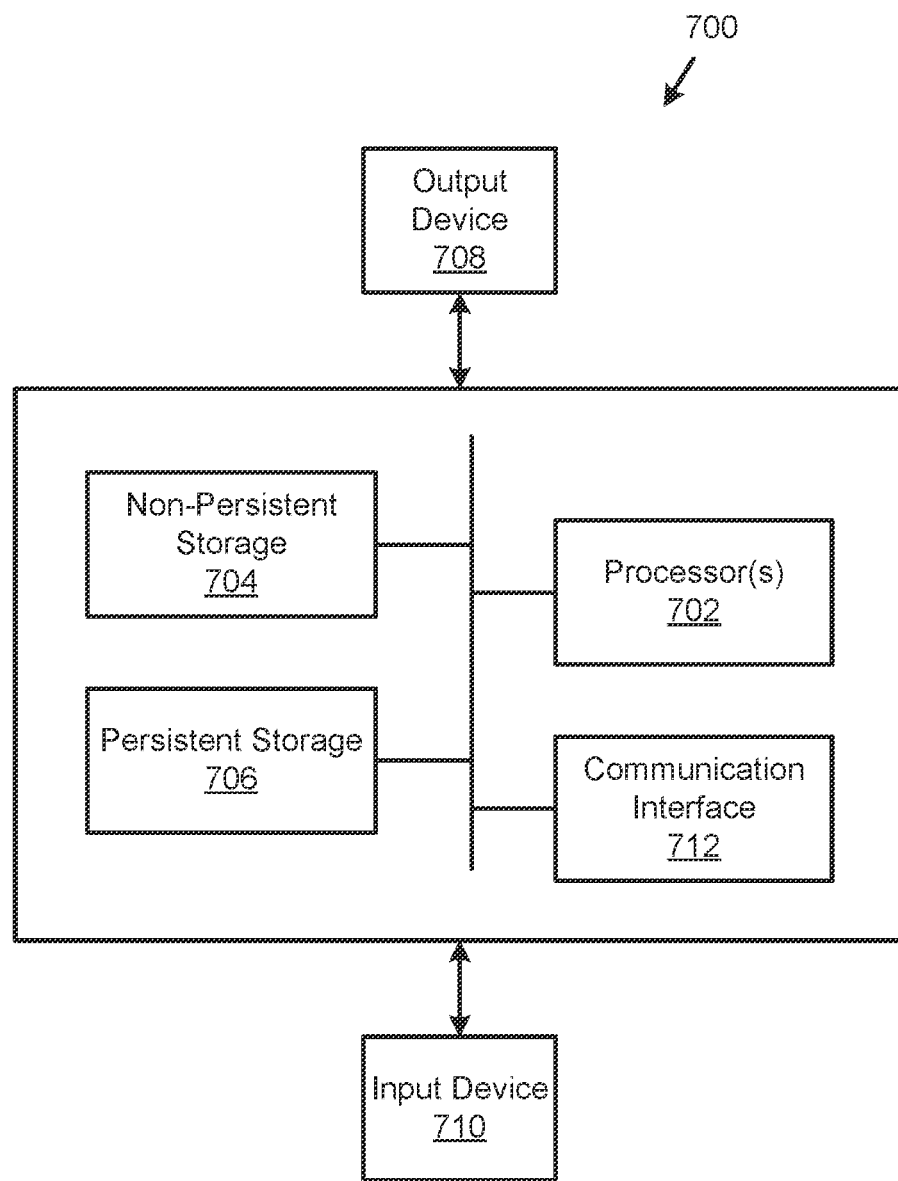
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth® interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for dynamically instantiating composed information handling systems. Specifically, embodiments of the invention may provide a system that instantiates and decommissions composed information handling systems as the demand for services provided by the composed information handling systems change over time. When a composed information handling system that was previously providing computer implemented services is decommissioned, the deallocated computing resources may be divided into different pools. Some of the pools may allow the deallocated computing resources to be freely reallocated while other pools may restrict how the computing resources may be reallocated. Consequently, the system may improve the likelihood that computer implemented services may be quickly resumed in accordance with demand levels using, in part, the computing resources in the reserved pool.

Thus, embodiments of the invention may address the problem of limited computing resources in a distributed system for performing workloads. For example, by reserving some computing resources for the performance of workloads that may be resumed in the future, the system may allow for the free reallocation of other resources while also improving the likelihood that performance of the workloads may be quickly resumed to meet demand.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A system control processor manager for performing workloads using composed information handling systems instantiated using information handling systems, comprising:

persistent storage; and
a processor programmed to:
  obtain performance information for a workload of the workloads;
  make a determination, based on the performance information, to suspend performance of the workload;
  in response to the determination:
    deallocate a first computing resource of a composed information handling system performing the workload to a reserved pool,
    wherein the composed information handling system is generated in response to a composition request,
    wherein the composition request specifies an intent based model;
    deallocate a second computing resource of the composed information handling system to a freely allocable pool;
  after deallocating the first computing resource and the second computing resource:
    identify an occurrence of a workload resumption event for the workload based on workload demand; and
  in response to identifying the occurrence:
    allocate the first computing resource from the reserved pool to a new composed information handling system;
    allocate a third computing resource from the freely allocable pool to the new composed information handling system;
    restore a state of the first computing resource to match a deallocation state of the first computing resource to obtain a resumed composed information handling system; and
    perform the workload using the resumed composed information handling system to provide computer implemented services,
  wherein after deallocating the second computing resource, the second computing resource is allocated to an additional composed information system prior to the first and third computing resources being allocated to the new composed information handling system.

2. The system control processor manager of claim 1, wherein the first computing resource comprises at least one state dependent hardware device that operates based on states.

3. The system control processor manager of claim 2, wherein the state dependent hardware device comprises a graphics processing unit.

4. The system control processor manager of claim 2, wherein the state dependent hardware device comprises a compute acceleration unit.

5. The system control processor manager of claim 4, wherein the second computing resource comprises a general purpose processor.

6. The system control processor manager of claim 4, wherein the second computing resource comprises a memory module.

7. The system control processor manager of claim 2, wherein the second computing resource does not comprise any state dependent hardware devices.

8. The system control processor manager of claim 1, wherein the workload monitor is further programmed to:
    generate a resumption package for the composed information handling system that comprises data usable to set a state of the first computing resource.

9. The system control processor manager of claim 8, wherein the resumption package comprises data stored in the first compute resource prior to deallocating the first computing resource.

10. The system control processor manager of claim 1, wherein the hardware resource set comprises the first computing resource after the first computing resource is allocated to the new composed information handling system.

11. A method for performing workloads using composed information handling systems instantiated using information handling systems, comprising:
    obtaining performance information for a workload of the workloads;
    making a determination, based on the performance information, to suspend performance of the workload;
    in response to the determination:
        deallocating a first computing resource of a composed information handling system performing the workload to a reserved pool,
        wherein the composed information handling system is generated in response to a composition request,
        wherein the composition request specifies an intent based model;
        deallocating a second computing resource of the composed information handling system to a freely allocable pool;
    after deallocating the first computing resource and the second computing resource:
        identifying an occurrence of a workload resumption event for the workload based on workload demand;
        in response to identifying the occurrence:
            allocating the first computing resource from the reserved pool to a new composed information handling system;
            allocating a third computing resource from the freely allocable pool to the new composed information handling system;
            restoring a state of the first computing resource to match a deallocation state of the first computing resource to obtain a resumed composed information handling system, and
            performing the workload using the resumed composed information handling system to provide computer implemented services,
    wherein after deallocating the second computing resource, the second computing resource is allocated to an additional composed information system prior to the first and third computing resources being allocated to the new composed information handling system.

12. The method of claim 11, wherein the new composed information handling system comprises a compute resource set, a hardware resource set, and a control resource set comprising a system control processor.

13. A non-transitory computer readable medium comprising computer readable program code, which when executed by a computer processor enables the computer processor to perform a method for performing workloads using composed information handling systems instantiated using information handling systems, the method comprising:
    obtaining performance information for a workload of the workloads;
    making a determination, based on the performance information, to suspend performance of the workload;
    in response to the determination:
        deallocating a first computing resource of a composed information handling system performing the workload to a reserved pool,
        wherein the composed information handling system is generated in response to a composition request,
        wherein the composition request specifies an intent based model; and
        deallocating a second computing resource of the composed information handling system to a freely allocable pool;
    after deallocating the first computing resource and the second computing resource:
        identifying an occurrence of a workload resumption event for the workload based on workload demand;
        in response to identifying the occurrence:
            allocating the first computing resource from the reserved pool to a new composed information handling system;
            allocating a third computing resource from the freely allocable pool to the new composed information handling system;
            restoring a state of the first computing resource to match a deallocation state of the first computing resource to obtain a resumed composed information handling system; and
            performing the workload using the resumed composed information handling system to provide computer implemented services,
    wherein after deallocating the second computing resource, the second computing resource is allocated to an additional composed information system prior to the first and third computing resources being allocated to the new composed information handling system.

14. The non-transitory computer readable medium of claim 13, wherein the new composed information handling system comprises a compute resource set, a hardware resource set, and a control resource set comprising a system control processor.

* * * * *